United States Patent
Lee

(10) Patent No.: US 10,114,247 B2
(45) Date of Patent: Oct. 30, 2018

(54) DISPLAY PANEL AND DISPLAY DEVICE HAVING THE SAME

(71) Applicant: SAMSUNG ELECTRONICS CO., LTD., Suwon-si (KR)

(72) Inventor: Kye Hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 15/095,678

(22) Filed: Apr. 11, 2016

(65) Prior Publication Data

US 2017/0031205 A1    Feb. 2, 2017

(30) Foreign Application Priority Data

Jul. 31, 2015  (KR) .......................... 10-2015-0108606

(51) Int. Cl.
*G02F 1/1335* (2006.01)
*G02B 6/293* (2006.01)
(Continued)

(52) U.S. Cl.
CPC .. *G02F 1/133514* (2013.01); *G02F 1/133502* (2013.01); *G02F 1/133555* (2013.01); *G02F 1/133617* (2013.01); *G02F 1/133621* (2013.01); *B82Y 20/00* (2013.01); *G02B 5/28* (2013.01); *G02B 6/29361* (2013.01); *G02F 1/133553* (2013.01); *G02F 2001/133562* (2013.01); *G02F 2001/133614* (2013.01); *G02F 2001/133624* (2013.01); *G02F 2202/36* (2013.01); *Y10S 977/774* (2013.01)

(58) Field of Classification Search
CPC ......... G02F 1/133514; G02F 1/133621; G02B 5/28; G02B 6/29361

USPC ............................ 359/586; 349/71, 106–109
See application file for complete search history.

(56) References Cited

U.S. PATENT DOCUMENTS 6,864,626 B1    3/2005  Weiss et al.
2003/0086038 A1*  5/2003  Okumura .......... G02F 1/133555
                                                                  349/115
(Continued)

FOREIGN PATENT DOCUMENTS

KR  1020120031360  *  4/2012 ......... G02F 1/13357
KR  10-2012-0097774 A    9/2012
(Continued)

OTHER PUBLICATIONS

International Search Report dated Aug. 30, 2016, issued by the International Searching Authority in counterpart International Application No. PCT/KR2016/004971 (PCT/ISA/210).
(Continued)

*Primary Examiner* — Ricky Mack
*Assistant Examiner* — Kristina Deherrera
(74) *Attorney, Agent, or Firm* — Sughrue Mion, PLLC

(57) ABSTRACT

A display panel and display device having the same are provided. The display panel includes a quantum dot color filter layer configured to convert a color of light; a transparent front substrate provided at a first side of the quantum dot color filter layer; and a low refractive layer provided between the quantum dot color filter layer and the front substrate, the low refractive layer having a refractive index that is lower than a refractive index of the quantum dot color filter layer.

16 Claims, 24 Drawing Sheets

(51) Int. Cl.
    *G02B 5/28*     (2006.01)
    *B82Y 20/00*    (2011.01)

(56) References Cited

U.S. PATENT DOCUMENTS

| | | |
|---|---|---|
| 2011/0089809 A1 | 4/2011 | Noh |
| 2011/0141769 A1 | 6/2011 | Lee et al. |
| 2011/0176328 A1 | 7/2011 | Anandan et al. |
| 2013/0135558 A1 | 5/2013 | Kim et al. |
| 2014/0160408 A1 | 6/2014 | Cho et al. |
| 2014/0204128 A1 | 7/2014 | Jiang |
| 2014/0293186 A1 | 10/2014 | Ek et al. |
| 2015/0109560 A1 | 4/2015 | Guo et al. |
| 2015/0176804 A1 | 6/2015 | Song et al. |
| 2016/0003998 A1* | 1/2016 | Benoit .............. G02F 1/133502 349/71 |
| 2016/0161801 A1* | 6/2016 | Watano .................. G02B 5/201 349/71 |

FOREIGN PATENT DOCUMENTS

| | | | |
|---|---|---|---|
| WO | 2014/123836 A1 | 8/2014 |
| WO | 2015/031603 A1 | 3/2015 |

OTHER PUBLICATIONS

Communication dated Dec. 1, 2016 issued by the European Patent Office in counterpart European Patent Application No. 16163403.5.
Communication dated Aug. 11, 2017 by the European Patent Office in counterpart European Patent Application No. 16163403.5.
Communication dated Apr. 4, 2018, issued by the European Patent Office in counterpart European Patent Application No. 16163403.5.

\* cited by examiner

DISPLAY PANEL AND DISPLAY DEVICE HAVING THE SAME

CROSS-REFERENCE TO RELATED APPLICATION(S)

This application claims priority from Korean Patent Application No. 10-2015-0108606, filed on Jul. 31, 2015 in the Korean Intellectual Property Office, the disclosure of which are incorporated herein by reference in its entirety.

BACKGROUND

1. Field

Exemplary embodiments relate to a display panel which uses quantum dots for a color filter, and a display device having the display panel.

2. Description of the Related Art

A display device equipped with a display panel for displaying an image is a device which is configured for displaying various formats of image data, such as broadcast signals.

Display panels may be divided into emissive display panels that are self-luminous and non-emissive display panels that require separate light sources. The emissive display panels include Cathode Ray Tube (CRT) panels, Electro Luminescence (EL) panels, Organic Light Emitting Diode (OLED) panels, Vacuum Fluorescence Display (VFD) panels, Field Emission Display (FED) panels, Plasma Display Panels (PDPs), etc., and the non-emissive display panels include Liquid Crystal Display (LCD) panels.

A display device that includes the LCD panel further includes a back light unit for emitting light to the rear side of the LCD panel, and the light emitted from the back light unit comes in colors while propagating through color filters included in the LCD panel. In the past, a dye or pigment was used to selectively transmit or block a particular wavelength, but recently, a scheme for filtering light by color conversion using quantum dots has begun being studied and developed.

SUMMARY

One or more exemplary embodiments provide a display panel and display device having the same within which a low refractive layer is arranged between a quantum dot filter layer and a glass substrate in order to reduce a proportional amount of light that has propagated through the quantum dot filter layer and that is totally reflected at the glass substrate.

One or more exemplary embodiments also provide a display panel and display device having the same which include partition walls configured to partition the quantum dot filter layer into respective color regions in order to improve efficiency by recycling the light incident to the partition walls.

In accordance with an aspect of an exemplary embodiment, there is provided a display panel including a quantum dot color filter layer configured to convert a color of light; a transparent front substrate provided at a first side of the quantum dot color filter layer; and a low refractive layer provided between the quantum dot color filter layer and the front substrate, the low refractive layer having a refractive index that is lower than a refractive index of the quantum dot color filter layer.

The refractive index of the low refractive layer may fall within a range of between 1.0 and 1.4.

The low refractive layer may include a resin within which nano-particles are distributed, and the nano-particles may include at least one from among titanium dioxide $TiO_2$ and zinc oxide $ZnO$.

The refractive index of the low refractive layer may be lower than a refractive index of the front substrate.

The refractive index of the front substrate may be higher than the refractive index of the quantum dot color filter layer.

The light may include blue light, and the display panel may further include a reflective layer provided at a second side of the quantum dot color filter layer that is opposite to the first side of the quantum dot color layer, the reflective layer being configured to transmit blue light therethrough and reflect light that has a wavelength longer than a wavelength of the blue light.

The display panel may further include an anti-reflective (AR) layer coated on a surface of the front substrate and configured to prevent Fresnel reflection.

According to an aspect of another exemplary embodiment, there is provided a display panel including: a quantum dot color filter layer including a plurality of converters and partition walls provided between the plurality of converters, each of the plurality of converters including quantum dot particles configured to convert a color of light, and each of the partition walls being configured to absorb light; a front substrate provided at a first side of the quantum dot color filter layer; and reflective walls which surround the partition walls and are configured to reflect light which propagates toward the partition walls.

Each of the reflective walls may include at least one reflective material from among titanium dioxide ($TiO_2$), zinc oxide ($ZnO$), iron oxide ($Fe_2O_3$), chrome oxide ($CrO$), cobalt oxide ($CoO$), stannic oxide ($SnO_2$), talc, and kaolin ($Al_2Si_2O_5(OH)_4$).

The display panel may further include a low refractive layer provided between the quantum dot color filter layer and the front substrate and having a refractive index that is lower than a refractive index of the quantum dot color filter layer.

The refractive index of the low refractive layer may fall within a range of between 1.0 and 1.4.

The low refractive layer may include a resin within which nano-particles are distributed, and wherein the nano-particles include at least one from among titanium dioxide $TiO_2$ and zinc oxide $ZnO$.

The refractive index of the low refractive layer may be lower than a refractive index of the front substrate.

The display panel may further include an anti-reflective (AR) layer coated on a surface of the front substrate and configured to prevent Fresnel reflection.

According to an aspect of another exemplary embodiment, there is provided a display device including: a back light unit which includes a light source configured to emit light; a quantum dot color filter layer configured to convert a color of light emitted from the light source; a front substrate provided at a first side of the quantum dot color filter layer that is opposite to a second side of the quantum dot color filter at which the back light unit is provided; and a low refractive layer provided between the quantum dot color filter layer and the front substrate, the low refractive layer having a refractive index that is lower than a refractive index of the quantum dot color filter layer.

The refractive index of the low refractive layer may fall within a range of between 1.0 and 1.4.

The low refractive layer may include a resin within which nano-particles are distributed, and wherein the nano-particles include at least one from among titanium dioxide TiO2 and zinc oxide ZnO.

The refractive index of the low refractive layer may be lower than a refractive index of the front substrate.

The light emitted from the light source may include blue light, and the display device may further include a reflective layer provided between the quantum dot color filter layer and the back light unit, the reflective layer being configured for transmit the blue light therethrough and reflect light that has a wavelength longer than a wavelength of the blue light.

The display device may further include an anti-reflective (AR) layer coated on a surface of the front substrate and configured to prevent Fresnel reflection.

According to an aspect of another exemplary embodiment, there is provided a display device including: a back light unit which includes a light source configured to emit light; a quantum dot color filter layer including a plurality of converters and partition walls provided between the plurality of converters, each of the plurality of converters including quantum dot particles configured to convert a color of the light emitted from the light source, each of the partition walls being arranged between the plurality of converters being configured to absorb light; a front substrate arranged at a first side of the quantum dot color filter layer that is opposite to a second side of the quantum dot color filter at which the back light unit is provided; and reflective walls which surround the partition walls and which are configured to reflect light which propagates toward the partition walls.

Each of the reflective walls may include at least one reflective material from among titanium dioxide (TiO2), zinc oxide (ZnO), iron oxide (Fe2O3), chrome oxide (CrO), cobalt oxide (CoO), stannic oxide (SnO2), talc, and kaolin (Al2Si2O5(OH)4).

The display device may further include a low refractive layer provided between the quantum dot color filter layer and the front substrate and having a refractive index that is lower than a refractive index of the quantum dot color filter layer.

The display device may further include an anti-reflective (AR) layer coated on a surface of the front substrate and configured to prevent Fresnel reflection.

BRIEF DESCRIPTION OF THE DRAWINGS

The above and/or other aspects will become more apparent by describing in detail exemplary embodiments with reference to the attached drawings in which.

Throughout the drawings, like reference numerals will be understood to refer to like parts, components, and structures.

DETAILED DESCRIPTION

Exemplary embodiments will now be described with reference to accompanying drawings.

A display panel in accordance with an exemplary embodiment may include a Liquid Crystal Display (LCD) panel which includes color filters in order to implement desired colors.

Common LCD panels use color filters which comprise dyes or pigments that absorb or transmit light based on a particular range of wavelengths. In this context, a "transmission" of light refers to facilitating a propagation of light through the color filter. For example, the color filters may include a blue color filter that facilitates a propagation (i.e., transmits) light that has a blue color but absorbs light that has other colors than the blue color; a green color filter that transmits light that has a green color but absorbs light that has other colors than the green color; and a red color filter that transmits light that has a red color but absorbs light that has other colors than the red color. In this case, since each of the color filters absorb some of incident light rays, a loss in brightness occurs and a color reproduction range narrows down. Accordingly, the display panel in accordance with an exemplary embodiment employs a color filter of a type that converts light instead of a color filter of a type that absorbs light.

Figure 1:
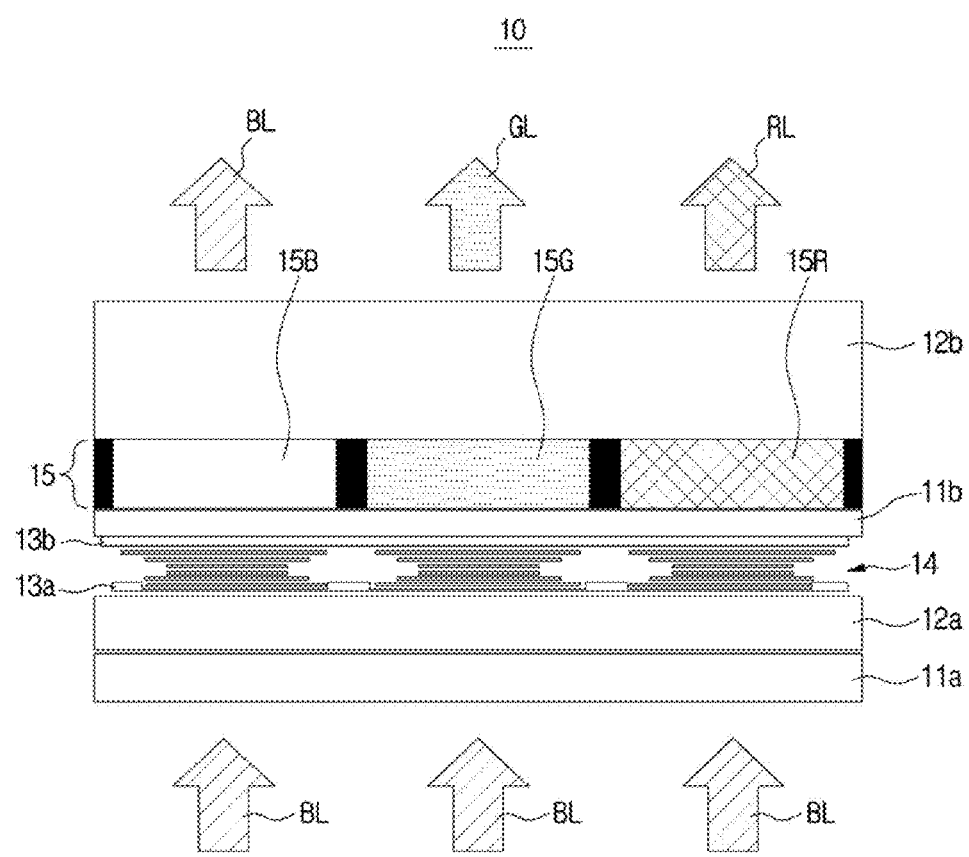
FIGS. 1 and 2 are side cross-sectional views of a display panel which includes a light conversion color filter.
Figure 2:
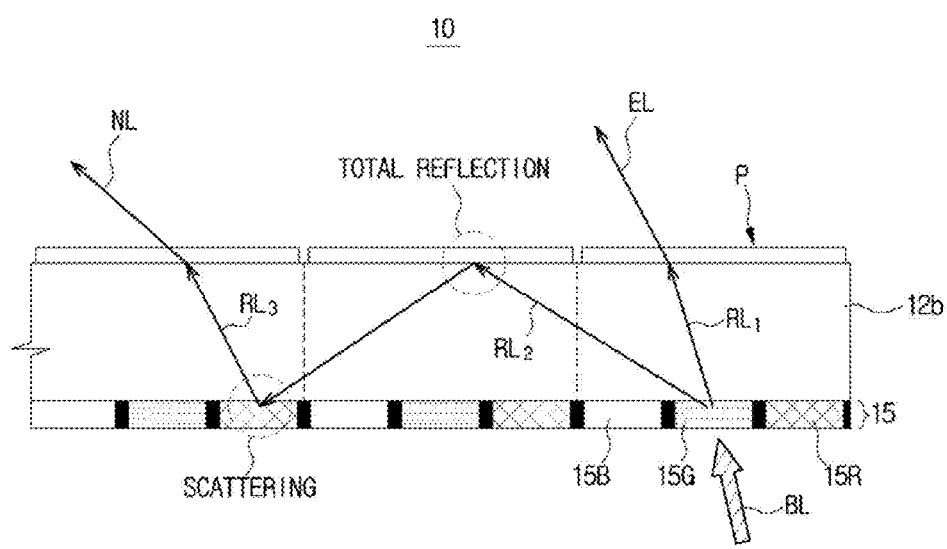

FIGS. 1 and 2 are side cross-sectional views of a display panel which includes a light conversion color filter. In the illustrative views of FIGS. 1 and 2, a direction in which light propagates corresponds to a direction in which images are provided to the viewer who looks at the display panel 10. This is referred to as a forward direction of the display panel 10.

Referring to FIG. 1, light, e.g., blue light BL which is irradiated from a back light unit, is incident to the display panel 10.

The blue light BL may be incident to a rear polarizer ha of the display panel 10, and the rear polarizer 11a may be configured to polarize the blue light BL such that only the light that fluctuates in the same direction as the polarization axis may propagate to a rear substrate 12a.

On the front face of the rear substrate 12a, rear electrodes 13a may be installed, and the rear electrodes 13a may be pixel electrodes. The rear substrate 12a may be formed of a transparent material, such as polymethyl methacrylate (PMMA) or glass.

A front polarizer 11b may be arranged ahead of the rear substrate 12a (i.e., beyond the rear substrate 12a with respect to the back light unit from which the light originates), and a front electrode 13b may be installed on the rear face of the front polarizer 11b. The front electrode 13b may be a common electrode.

A liquid crystal layer 14 may be inserted between the rear substrate 12a and the front polarizer 11b. As the liquid crystal layer 14 conducts current when a voltage is applied to the rear electrode 13a and the front electrode 13b, the array of liquid crystal molecules that constitute the liquid crystal layer 14 is regulated.

Light that has propagated through the liquid crystal layer 14 is incident to the front polarizer 11b, and the light that has propagated through the front polarizer 11b is incident to a quantum dot color filter layer 15 arranged on the front face of the front polarizer 11b.

The quantum dot color filter layer 15 may include a red light converter 15R, which is configured for converting incident light into red light by using quantum dots, and a green light converter 15G which is configured for converting incident light into green light by using quantum dots, and a light transmitter 15B which is configured for facilitating a propagation of the incident light.

The blue light BL incident to the quantum dot color filter layer 15 is converted to red light RL and green light BL in the red light converter 15R and green light converter 15G, respectively. The blue light BL incident to the light transmitter 15B is not color-converted, but transmitted without conversion.

The light that has propagated through the quantum dot color filter layer 15 or that has been color-converted in the quantum dot color filter layer 15 is incident to the front substrate 12b, which is arranged beyond the quantum dot color filter layer 15 with respect to the direction of light propagation. The light that has propagated through the front substrate 12b is observable by viewer as an image.

Referring to FIG. 2, a unit which comprises the aforementioned light transmitter 15B, red light converter 15R, and green light converter 15G may function as a pixel P in the entire display panel 10, and the pixels may be arranged in a two-dimensional (2D) array so as to produce a single image signal.

A propagation path of the light that is incident to the quantum dot color filter layer 15 will now be explained in connection with FIG. 2.

The blue light incident upon the quantum dot color filter layer 15 is color-converted in the quantum dot color filter layer 15 and has an isotropic emission pattern. In this regard, the refractive index of a medium that forms the quantum dot color filter layer 15 has a value that falls within a range of about 1.3 to about 2.0, and the refractive index of the front substrate 12b, which may be formed of glass, may have a value that falls within a range of about 1.3 to about 1.8. The refractive index of air is 1.0.

A ray of light bends when propagating from one medium to another, when the mediums have different refractive indexes due to different densities. The ray bends toward the one that has a greater refractive index, and in this case, since the refractive index of the front substrate 12b is greater than that of the air, the light that has propagated through the front substrate 12b and is emitted out of the front substrate 12b bends toward the front substrate 12b. At this time, a ray of light $RL_2$ for which an incidence angle with respect to a boundary surface between the front substrate 12b and the air is greater than a total reflection threshold angle is totally reflected to the inside of the front substrate 12b, and a ray of light $RL_1$ for which an incidence angle is smaller than the total reflection threshold angle propagates through the front substrate 12b, thereby enabling the ray of light $RL_1$ to serve as effective light (EL).

The ray of light $RL_2$, which is totally internally reflected, may be absorbed by a structure inside the display panel 10 and may thus disappear, or may be incident to another pixel area and then scattered or color-converted and emitted, as illustrated in FIG. 2. Since a ray of light $RL_3$ that was subjected to color conversion in another pixel area is not intended for the original pixel, it is emitted, thereby rendering the ray of $RL_3$ to serve as noise light NL, and consequently causing a degradation of image quality. In the case the ray of light $RL_2$ being absorbed and disappearing, light output efficiency may be degraded.

Accordingly, the display panel in accordance with an exemplary embodiment may include a low refractive layer which has a low refractive index and which is arranged between the quantum dot color filter layer and the front substrate, in order to reduce a proportional amount of total internal reflection at the boundary surface between the front substrate and the external air. A structure of the display panel in accordance with an exemplary embodiment will now be described.

Figure 3:
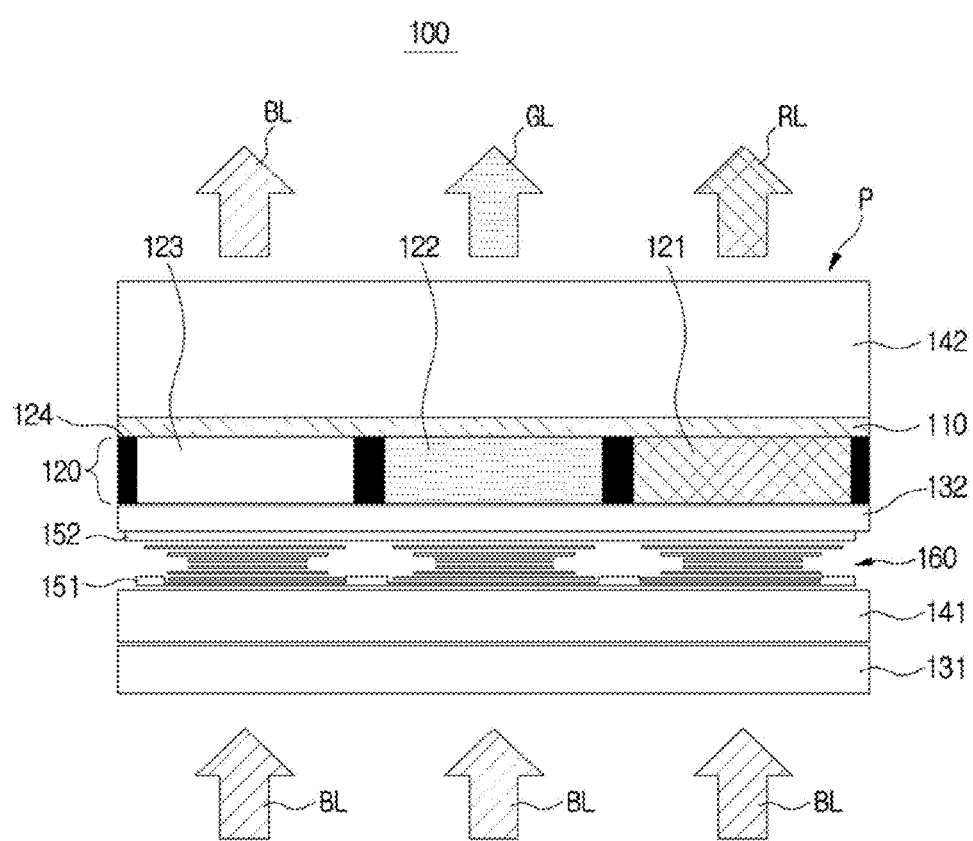
FIG. 3 is a side cross-sectional view of a display panel structure, according to an exemplary embodiment.
Figure 4:
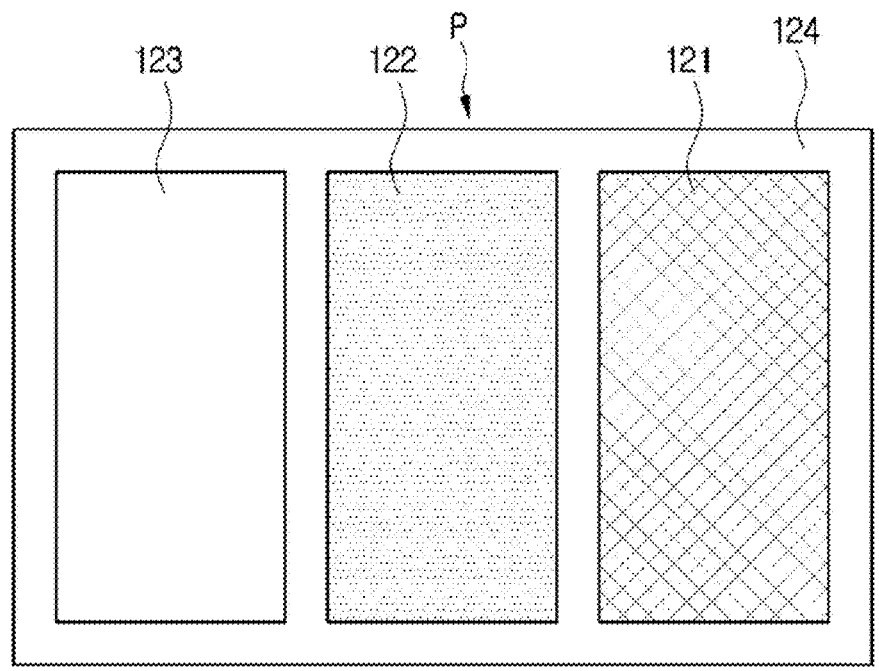
FIG. 4 is a top plane view of a single pixel unit in the display panel of FIG. 3.

FIG. 3 is a side cross-sectional view of a display panel structure, according to an exemplary embodiment, and FIG. 4 is a top plane view of a single pixel unit of the display panel of FIG. 3. In the illustrative views of FIG. 3, a direction in which light propagates corresponds to a direction in which images are provided to the viewer who looks at the display panel 100. This is a forward direction of the display panel 100.

Referring to FIG. 3, the light, e.g., blue light BL which is irradiated from a back light unit, is incident to the display panel 100.

The blue light BL may be incident to a rear polarizer 131 of the display panel 100, and the rear polarizer 131 may be configured to polarize the blue light BL and to only transmit rays that fluctuate in the same direction as the polarization axis to a rear substrate 141. In this exemplary embodiment, with respect to a liquid crystal layer 160, the front face refers to a direction in which the light propagates and the rear face refers to a direction from which a light source is located, i.e., from which the light is incident.

A rear polarizer 131 may be implemented in the form of a film, and may be implemented as a vertical polarizer that vertically polarizes the incident light or as a horizontal polarizer that horizontally polarizes the incident light.

A rear substrate 141 may be located on the front face of the rear polarizer 131. The rear substrate 141 may be formed of a transparent material in order to facilitate propagation therethrough of the light incident from the rear direction. For example, the rear substrate 141 may be formed of a synthetic resin such as acryl, or glass.

A front polarizer 132 may be located ahead of the rear substrate 141, and a liquid crystal layer 160 filled with liquid crystals may be formed between the rear substrate 141 and the front polarizer 132.

On the rear substrate, a number of gate lines (not shown), data lines (not shown), switching devices (not shown), and rear electrodes 151 may be installed, and on the front polarizer 132, a front electrode 152 may be installed. The rear electrodes 151 may include pixel electrodes, and the front electrode 152 may include a common electrode.

The gate lines are arrayed in lines and configured to deliver gate signals, and the data lines are arrayed in columns and configured to deliver data signals. The rear electrodes 151 may be connected to the gate lines and data lines.

The switching devices may be implemented with Thin Film Transistors (TFTs) formed at intersections of the gate lines and data lines. The source electrode of a TFT is connected to a data line, the gate electrode of the TFT is connected to a gate line, and the drain electrode of the TFT is connected to the rear electrode 151 and a capacitor.

The gate and data lines may be formed of particular materials, such as Indium Tin Oxide (ITO) or Indium Zinc Oxide (IZO).

When a scan signal is applied to the gate line, the TFT is turned on and delivers a data signal supplied from the data line to the rear electrode 151.

When a certain voltage is applied to the front electrode 152, an electric field is produced between the front electrode 152 and the rear electrode 151, and the electric field regulates the array of liquid crystals of the liquid crystal layer 160.

Depending on an arrangement of the array of liquid crystals, a direction in which the light incident to the liquid crystal layer 160 fluctuates may vary or remain unchanged. For example, in a case that the rear polarizer 131 is a vertical polarizer, the front polarizer 132 is a horizontal polarizer, and the liquid crystals are spirally arrayed, the light that has been vertically polarized while propagating through the rear polarizer 131 is polarized horizontally while propagating through the liquid crystal layer 160. The light polarized horizontally may propagate through the front polarizer 132 and be incident to the quantum dot color filter layer 120 which is located on the front face of the front polarizer 132.

The quantum dot color filter layer 120 may include a red light converter 121 which is configured for converting an incident light ray into red light, a green light converter 122 which is configured for converting an incident light ray into green light, and a light transmitter 123 which is configured for transmitting an incident light ray without color conversion. The order in which the converters and transmitter are arranged may be different from the order as shown in FIG. 3.

The red light converter 121 and green light converter 122 may use quantum dots in order to convert respective colors of light. The light transmitter 123 may have the form of a cavity for the incident light to pass as it is, or may be formed of a transparent resin, such as acryl-nitrile butadiene styrene (ABS), poly methyl methacrylate (PMMA), poly carbonate (PC), etc.

To partition the respective cells of the red light converter 121, green light converter 122, and light transmitter 123, there may be partition walls 124, which may be in the form of black matrices. The partition walls 124 may be configured to block the light from propagating into another cell, thereby improving contrast.

The partition walls 124 may be implemented in black color so as to absorb light, and may be formed of metals, synthetic resins, synthetic rubbers, organic carbon materials, etc. For example, they may be formed of chrome (Cr) films, chrome oxide (CrOx) films, or double films including same.

Referring to FIG. 4, the red light converter 121, green light converter 122, and light transmitter 123 may constitute a single pixel P. Such pixels may be arrayed two-dimensionally in order to implement respective colors of a 2D image.

Figure 5:
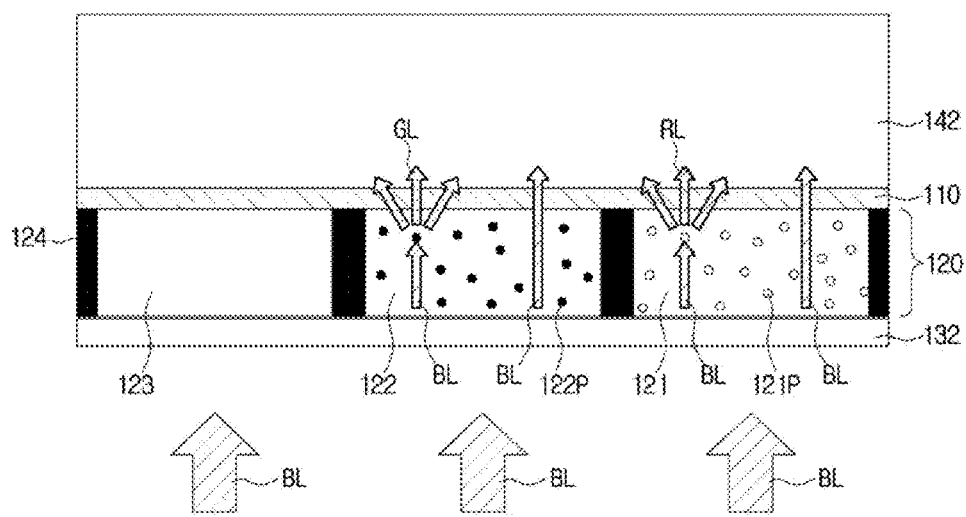
FIG. 5 shows an internal structure of a quantum dot color filter layer of a display panel, according to an exemplary embodiment.

FIG. 5 shows an internal structure of a quantum dot color filter layer of a display panel, according to an exemplary embodiment.

A quantum dot refers to a small spherical semiconductor particle that has a diameter of a few nanometers, and may comprise a few to tens of nanometers of core and a coating formed of zinc sulfide (ZnS). For example, any of cadmium selenide (CdSe), cadmium telluride, or cadmium sulfide (CdS) may be used for the core of the quantum dot.

Because the quantum dot is very small in size, a quantum confinement effect occurs. The quantum confinement effect refers to an effect in which an electron in a very small particle contributes to a discontinuous energy state due to an outer wall of the particle, which may give rise to a phenomenon by which as the size of space in the particle decreases, the energy level of the electron becomes relatively high and the energy band gap becomes larger. Due to this quantum confinement effect, the quantum dot may produce light of a wide range of wavelengths when the light, such as ultraviolet rays or visible rays, is incident upon the quantum dot.

A wavelength of the light produced from the quantum dot (QD) may vary based on the size of the particle. In particular, if the light of a wavelength for which an energy level is greater than the energy band gap is incident upon the quantum dot, the quantum dot is excited by absorbing the energy of the light, and the quantum dot is classified as being in the ground state by emitting light of a particular wavelength. In this case, as the size of the quantum dot decreases, the quantum dot produces light that has a relatively short wavelength, e.g., blue light or green light, and as the size of the QD increases, the QD produces light that has a relatively long wavelength, e.g., red light. Accordingly, various colors of light may be implemented in accordance with the size of the quantum dot.

Hereinafter, a quantum dot particle that may emit green light is referred to as a green quantum dot particle, and a quantum dot particle that may emit red light is referred to as a red quantum dot particle.

For example, the green quantum dot particle may be a particle that has a width of between about 2 nanometers and about 3 nanometers, and the red quantum dot particle may be a particle that has a width of between about 5 and about 6 nanometers.

Referring to FIG. 5, the red light converter 121 may include red quantum dot particles 121P, and the green light converter 122 may include green quantum dot particles 122P. For example, the red light converter 121 may be formed such that red quantum dot particles 121P are distributed in a resin, and the green light converter 122 may be formed such that green quantum dot particles 122P are distributed in a resin.

Blue light BL that is incident to the red light converter 121 and encounters the red quantum dot particle 121P may be converted to red light and then be scattered, and blue light BL that is incident to the green light converter 121 and encounters the green quantum dot particle 122P may be converted to green light and then be scattered.

The light transmitter 123 may facilitate a propagation of the incident light without color conversion. In a case that the back light unit irradiates blue light, the blue light passes the light transmitter 123 as it is, i.e., without color conversion or frequency shift. Accordingly, the light that has propagated through the red light converter 121, the green light converter 122, and the light transmitter 123 may emerge therefrom as red light, green light, and blue light, respectively. FIG. 5 shows light output from the respective converters and transmitter without consideration of refraction or reflection at the boundary surface.

A low refractive layer 110 which is formed of a low refractive medium may be arranged on the front face of the quantum dot color filter layer 120. The low refractive layer 110 may have a lower refractive index than the quantum dot color filter layer 120. Furthermore, the low refractive layer 110 may have a lower refractive index than the front substrate 142 that is located on the front face of the low refractive layer 110. For example, the low refractive layer 110 may have a refractive index which falls within a range of from about 1.0 to about 1.4.

The low refractive layer 110 may be formed of a resin and nano-particles, such as zinc oxide (Zn), titanium dioxide ($TiO_2$), etc., which are distributed in the resin. The materials like zinc oxide and titanium dioxide are only examples to be applied in the low refractive layer 110, but the exemplary embodiment of the display panel 100 is not limited thereto.

The low refractive layer 110 may reduce a proportional amount of light that is subjected to total internal reflection at the boundary surface between the front substrate 142 and the external air by reducing an angle at which the light is output from the low refractive layer 110 to the front substrate 142, or by totally reflecting the rays having large incidence angles from among rays output from the quantum dot color filter layer 120. Influences of the low refractive layer 110 to a light path will now be described with respect to FIGS. 6 and 7.

A front substrate 142 is arranged on the front face of the low refractive layer 110. Similar to the rear substrate 141, the front substrate 142 may also be formed of a synthetic resin, such as, for example, acryl, or glass.

Figure 6:
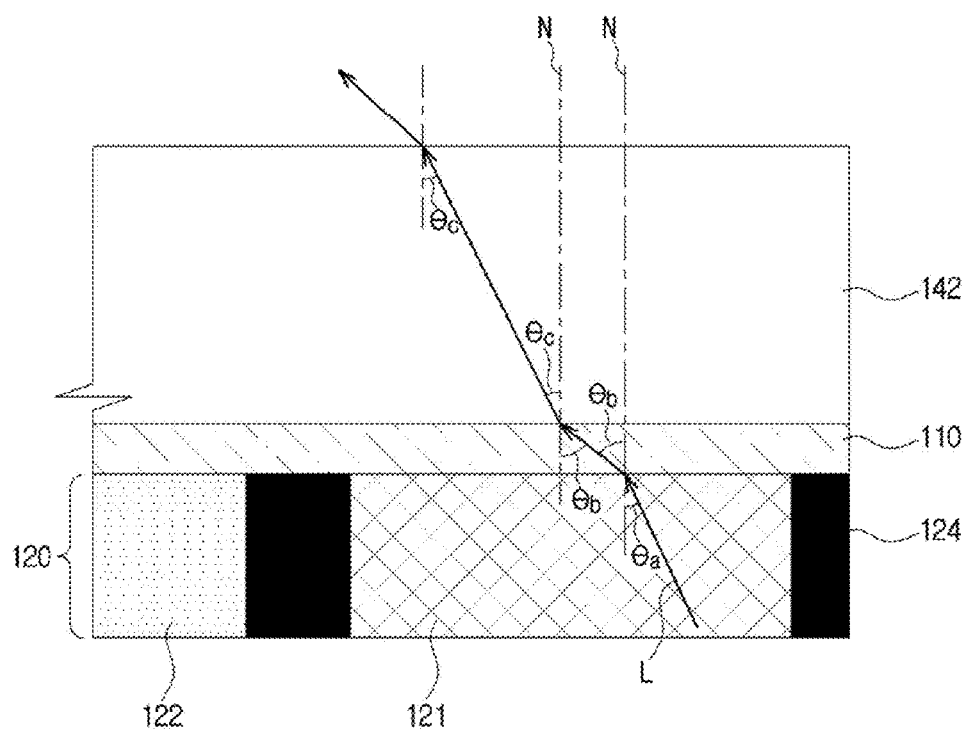
FIGS. 6 and 7 show light paths inside a display panel, according to exemplary embodiments.
Figure 7:
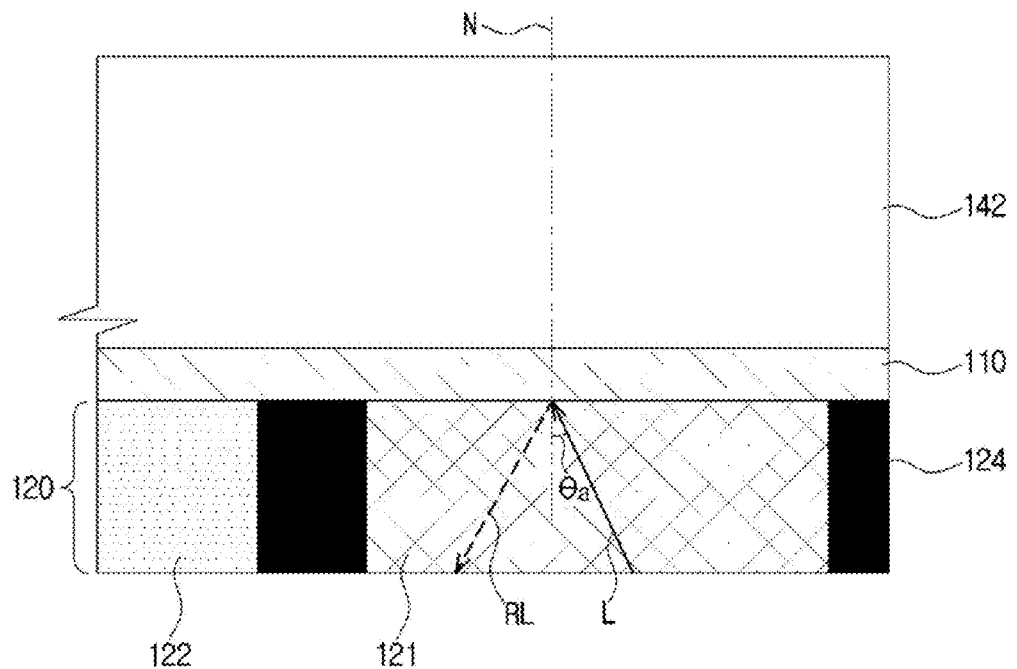

FIGS. 6 and 7 show light paths inside a display panel according to exemplary embodiments. In FIGS. 6 and 7, a structure located behind the quantum dot color filter layer 120 is omitted.

As described above, rays incident from a medium which has a relatively high refractive index to a medium which has a lower refractive index bend toward the medium having the higher refractive index at the boundary surface between the two mediums, and total internal reflection occurs when the incidence angle of a particular ray is equal to or greater than the total reflection threshold angle. Since the refractive index of the low refractive layer 110 is lower than that of the quantum dot color filter layer 120, the light L incident from the quantum dot color filter layer 120 to the low refractive layer 110 is bent toward the quantum dot color filter layer 120. In particular, the incidence angle $\theta_a$ is smaller than the refraction angle $\theta_b$. The incidence angle and refraction angle are measured with respect to a normal line which is perpendicular to a plane that is parallel with the display panel 100.

Furthermore, since the refractive index of the front substrate 142 is higher than that of the low refractive layer 110, the light L incident from the low refractive layer 110 upon the front substrate 142 bends toward the front substrate 142. The incidence angle $\theta_b$ is greater than the refraction angle $\theta_c$.

The refraction angle $\theta_c$ in the front substrate 142 is equal to an incidence angle at which the light is incident into the external air. In particular, because the low refractive layer 110 is located between the quantum dot color filter layer 120 and the front substrate 142, the incidence angle of light to the external air from the front substrate 142 is reduced. Accordingly, a proportional amount of incident light that is subjected to total internal reflection with respect to the front substrate 142 is reduced.

Referring to FIG. 7, when the incidence angle $\theta_a$ at which the light L is incident from the quantum dot color filter layer 120 to the low refractive layer 110 is equal to or greater than the total reflection threshold angle, total internal reflection occurs at the boundary surface between the quantum dot color filter layer 120 and the low refractive layer 110 toward the quantum dot color filter layer 120. In particular, the light L that was directed to the low refractive layer 110 propagates back to the inside of the quantum dot color filter layer 120.

In this aspect, since the light with large incidence angle is already totally reflected at the boundary surface between the quantum dot color filter layer 120 and the low refractive layer 110, a proportional amount of total reflection at the boundary surface between the front substrate 142 and the external air may be reduced. Accordingly, a phenomenon that the light totally reflected at the boundary surface between the front substrate 142 and the external air moves to another pixel and thus causes degradation of image quality may be alleviated.

Figure 8:
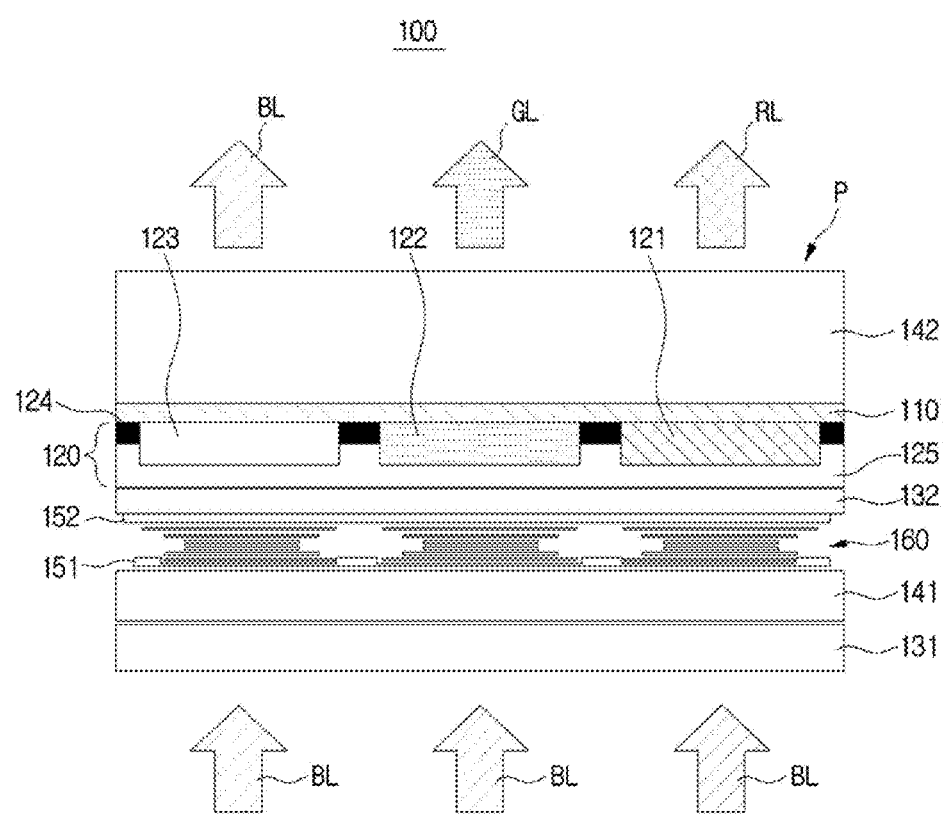
FIG. 8 is a side cross-sectional view of a display panel structure, according to another exemplary embodiment.
Figure 9:
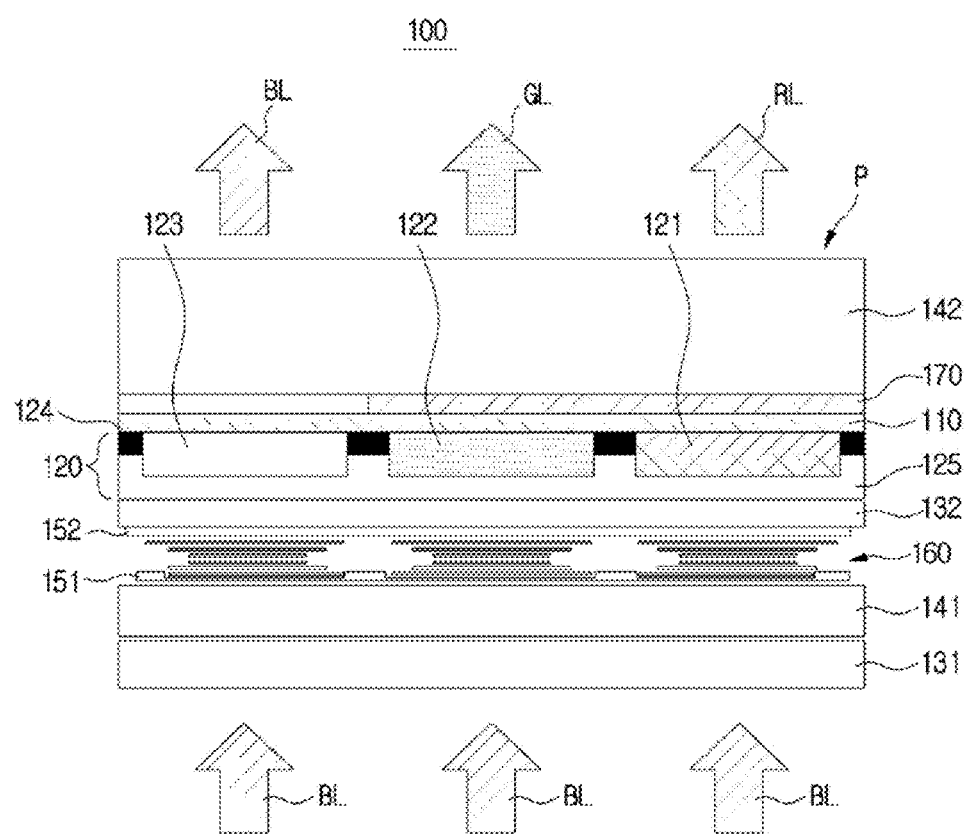
FIG. 9 is a side cross-sectional view of a display panel structure, according to another exemplary embodiment.
Figure 10:
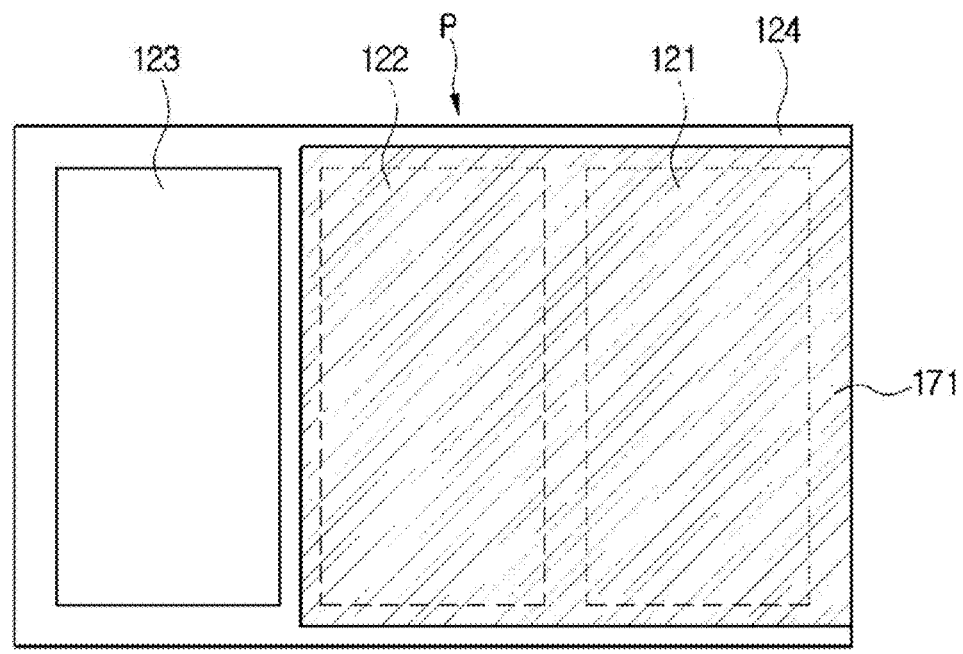
FIG. 10 is a top plane view for locating a blue light cutoff layer as viewed from above.

FIG. 8 is a side cross-sectional view of a display panel structure, according to another exemplary embodiment, FIG. 9 is a side cross-sectional view of a display panel structure, according to another exemplary embodiment, and FIG. 10 is a top plane view for locating a blue light cutoff layer as viewed from above.

Referring to FIG. 8, the display panel 100 may further include a smoothing layer 125 which is configured for smoothing the quantum dot color filter layer 120. The smoothing layer 125 may be formed on the rear side of the quantum dot color filter layer 120. The smoothing layer 125 may also be referred to as an overcoat, which may include e.g., an acrylic resin or a polyimide resin. The materials are only examples to be used in the smoothing layer 125, but the exemplary embodiment of the display panel 100 is not limited thereto.

Once the smoothing layer 125 is formed on the quantum dot filter layer 120, steps formed between the members that constitute the quantum dot color filter layer 120 may help implement good image quality, even if the surface is not smooth.

The display panel 100 may further include a cutoff layer 170 which is configured for cutting off rays that have not been color-converted, as shown in FIG. 9.

As described above, most of rays incident to the quantum dot color filter layer 120 are converted to red light and green light by the red light converter 121 and green light converter 122, respectively, but some incident rays that do not come in contact with the quantum dots may be emitted without color conversion. In the latter case, blue light is output from the red light converter 121 or green light converter 122, and if the blue light output from the red light converter 121 or green light converter 122 travels through the front substrate 142 to the outside, the blue light may lower color reproductivity performance of the display panel 100 and lead to degradation of image quality.

Accordingly, with the cutoff layer 170 installed on the rear face of the front substrate 131 for filtering out blue rays, the display panel 100 may prevent the blue rays output from the red light converter 121 or green light converter 122 from being emitted. The blue light cutoff layer 170 may be arranged between the front substrate 131 and the low refractive layer 110.

For example, the cutoff layer 170 may include a blue light cutoff filter 171. As shown in FIG. 10, the blue light cutoff filter 171 may be formed to be wide enough to cover the red light converter 121 and green light converter 122 of the quantum dot color filter layer 120, but not to cover the light transmitter 123 that facilitates the propagation of blue light.

Furthermore, the cutoff layer 170 may be formed for each pixel P on the quantum color filter layer 120. Accordingly, a plurality of blue light cutoff filters 171 may be arrayed two-dimensionally, i.e., in 2D, so as to correspond to the respective pixels P on the quantum dot color filter layer 120, thus constituting the cutoff layer 170.

Figure 11:
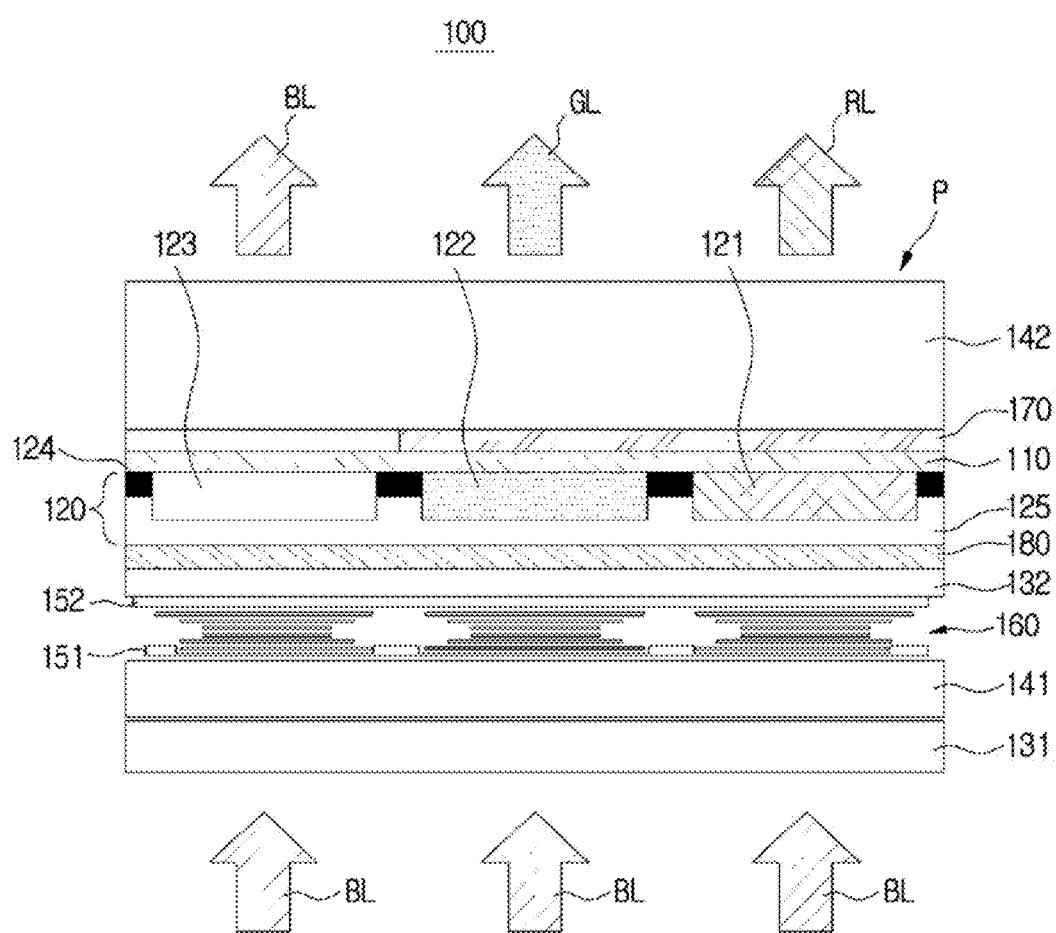
FIG. 11 is a side cross-sectional view of a display panel, according to another exemplary embodiment.
Figure 12:
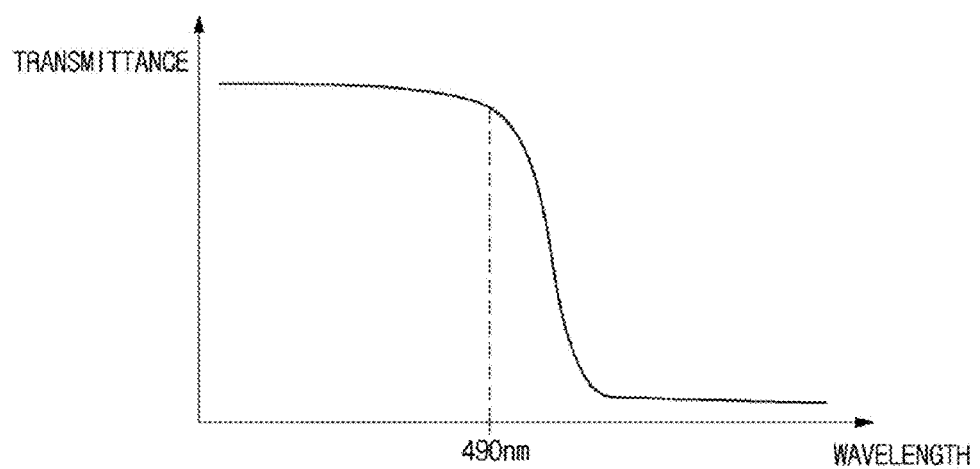
FIG. 12 shows a graph representing transmittance versus wavelength with respect to a reflective layer.

FIG. 11 is a side cross-sectional view of a display panel, according to another exemplary embodiment, and FIG. 12 shows a graph representing transmittance versus wavelength with respect to a reflective layer.

Referring to FIG. 11, the display panel 100 may further include a reflective layer 180 which is arranged on the rear side of the quantum dot color filter layer 120. The reflective layer 180 may be transparent to wavelengths that are shorter than a particular reference wavelength but may reflect wavelengths that are longer than the reference wavelength.

For example, the reflective layer 180 may include a dichroic filter which is configured for facilitating a propagation of rays that have a blue wavelength and for reflecting rays that have wavelengths that are longer than the blue wavelength. Accordingly, the reflective layer 180 located on the rear side of the quantum dot color filter layer 120 may transmit blue light and rays with shorter wavelengths that are irradiated from a light source of the back light unit, and reflect rays that have longer wavelengths than the blue light.

Referring to FIG. 12, the reflective layer 180 may be transparent to rays that have wavelengths of about 490 nm or less, and may reflect light that has a wavelength of more than about 490 nm. Since blue rays have wavelengths that fall within a range of from about 440 nm to about 490 nm, green rays have a corresponding range of about 490 nm to about 570 nm, and red rays have a corresponding range of about 620 nm to about 780 nm, the reflective layer 180 may selectively deliver the blue light to the quantum dot color filter layer 120.

The aforementioned smoothing layer 125, cutoff layer 170 and reflective layer 180 may be optionally included in the display panel 100. The display panel 100 may include all of these elements, or may include only some of these elements, or may not include any of these elements.

While the cutoff layer 170 filters out the blue light in the aforementioned exemplary embodiment, wavelengths to be filtered out by the cutoff layer 170 may vary based on a wavelength of light which is irradiated from the back light unit.

Furthermore, while the reflective layer 180 transmits the blue light and reflects light that has longer wavelengths than the blue light, wavelengths to be reflected by the reflective layer 180 may vary based on a wavelength of light which is irradiated from the back light unit.

Light paths that correspond to a case in which the display panel 100 includes all the smoothing layer 125, cutoff layer 125, and reflective layer 180 will now be described.

Figure 13:
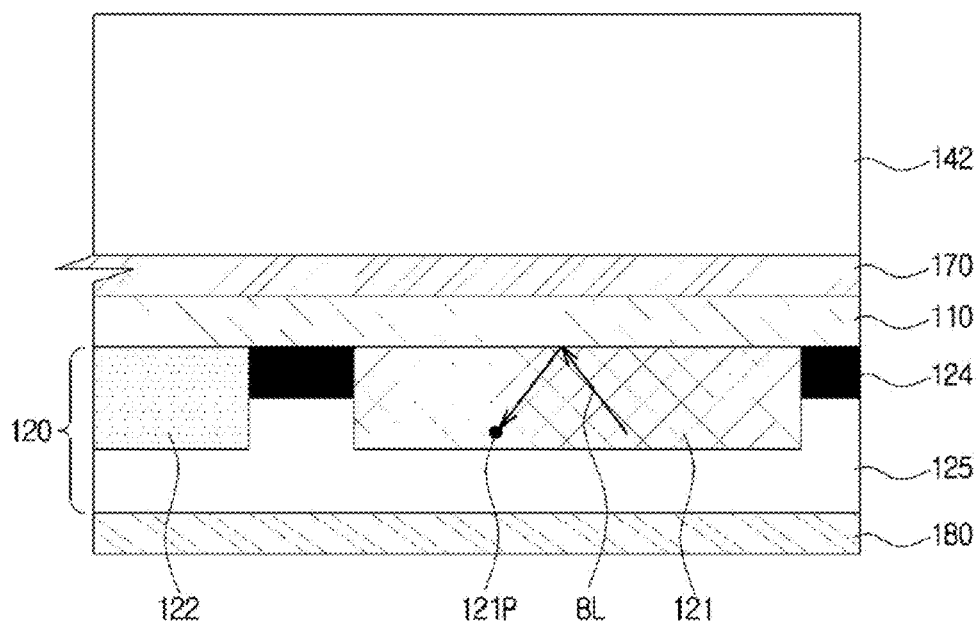
FIGS. 13 and 14 show light paths inside a display panel, according to exemplary embodiments.
Figure 14:
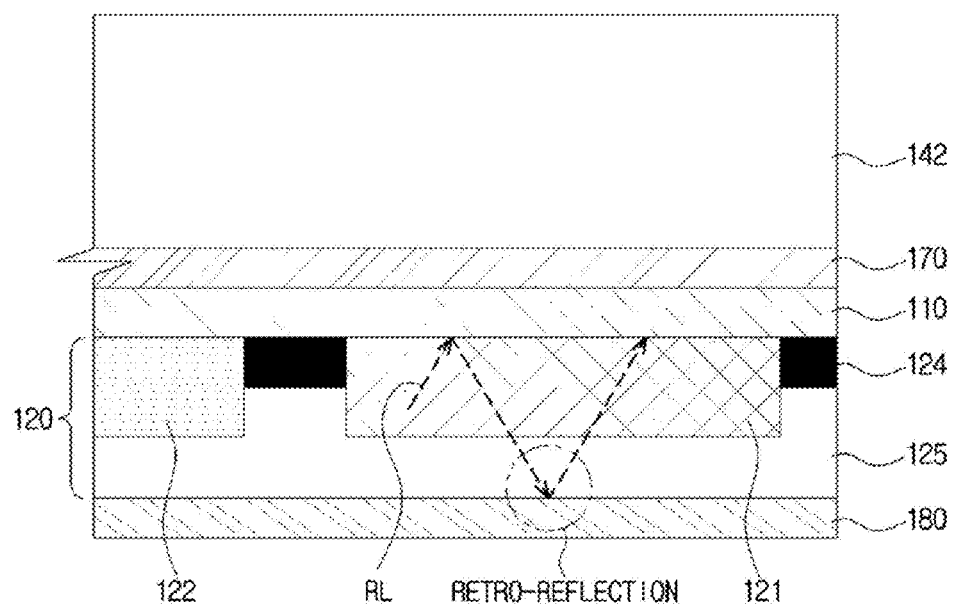

FIGS. 13 and 14 show light paths inside a display panel, according to exemplary embodiments. In FIGS. 13 and 14, the structure behind the reflective layer 180 is omitted.

As shown in FIG. 13, if the totally reflected light is blue light that has not come in contact with quantum dots and thus not been color-converted, the blue light has another chance of being color-converted by coming into contact with red quantum dot particles 121P contained in the red light converter 121. In particular, the blue light BL that is totally reflected into the red light converter 121 at the boundary surface between the red light converter 121 of the quantum dot color filter layer 120 and the low refractive layer 110 may be converted to red light RL by coming into contact with red quantum dot particles inside the red light converter 121.

As described above, rays which have large incidence angles with respect to the low refractive layer 110 are totally reflected back into the quantum dot color filter layer 120. As shown in FIG. 14, if the totally reflected ray is red light RL that has been converted, the ray is retro-reflected at the reflective layer 180 and therefore propagates back to the low refractive layer 110. If the incidence angle to the low refractive layer 110 is not greater than the total reflection threshold angle, the red light reflected at the reflective layer 180 has a chance of being emitted out of the front substrate 142.

As shown in FIGS. 13 and 14, even if some rays are totally reflected at the boundary surface between the quantum dot color filter layer 120 and the low reflective layer 110, these rays have a chance of being emitted by being reflected again or color-converted inside the quantum dot color filter layer 120, thus preventing degradation of efficiency due to total internal reflection.

Moreover, even if blue light that had not been color-converted in the converters 121 and 122 was not totally reflected at the boundary surface between the quantum dot color filter layer 120 and the low refractive layer 110, the blue light may act as a factor with respect to efficiency degradation by being filtered out in the cutoff layer 170. However, if the blue light is totally reflected at the boundary surface between the quantum dot color filter layer 120 and the low refractive layer 110, the blue light may have another chance of being color-converted, thus helping improve efficiency.

Figure 15:
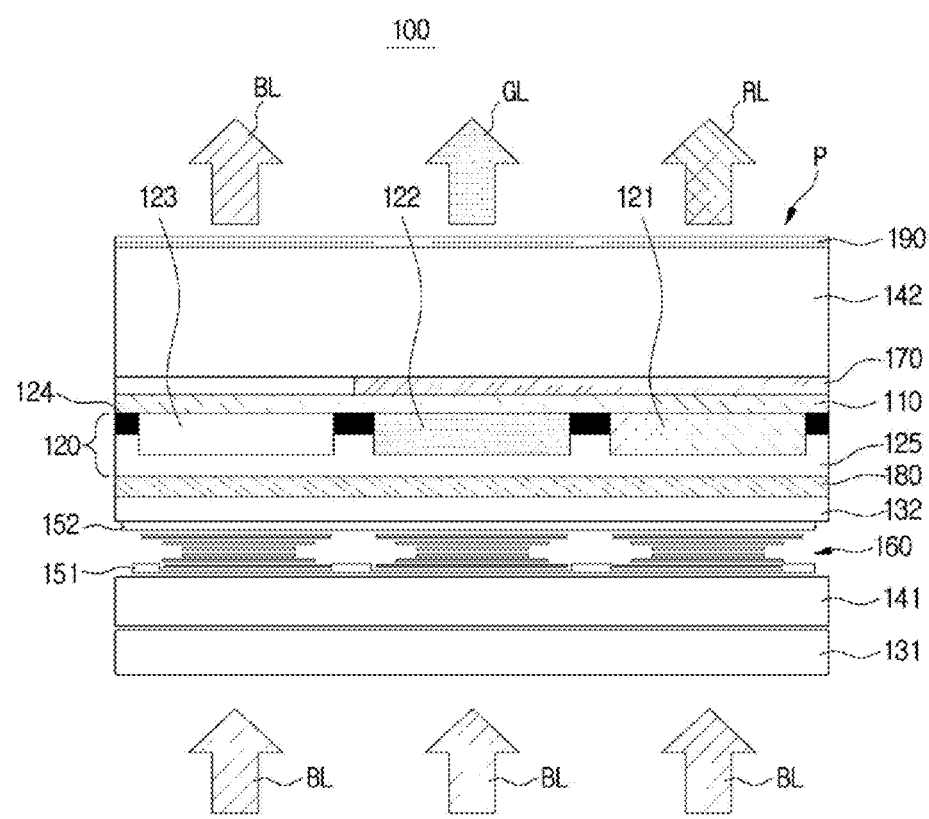
FIG. 15 is a side cross-sectional view of a display panel, according to another exemplary embodiment.
Figure 16:
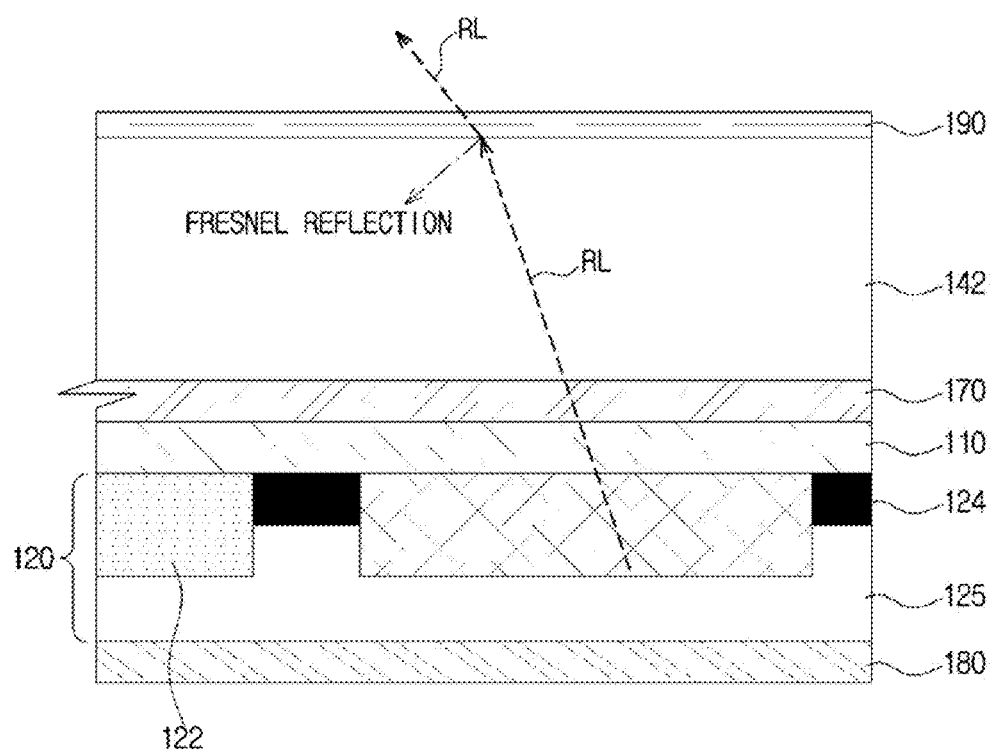
FIG. 16 shows a light path inside the display panel of FIG. 15.

FIG. 15 is a side cross-sectional view of a display panel, according to another exemplary embodiment, and FIG. 16 shows a light path inside the display panel of FIG. 15.

Referring to FIG. 15, the display panel 100 may further include an anti-reflective (AR) layer 190 which is arranged on the front side of the front substrate 142. The AR layer 190 may include an AR coating layer or an anti-glare low-reflective coating layer.

For example, the AR layer 190 may include coating layers coated with a material that has a relatively high refractive index and coating layers coated with a material that has a relatively low refractive index, which may alternate with each other in multiple layers.

Low refractive oxides, such as silicon dioxide $SiO_2$, may be used as the low refractive index material, and at least one of high refractive inorganic oxides, such as titanium dioxide $TiO_2$, zirconium dioxide $ZrO_2$, lithium niobate $LiNbO_3$, lithium tantalate $LiTaO_3$, lanthanum titanium $LaTiO_2$, etc., may be used as the high refractive index material.

The coating layer coated with the high refractive index material may have a refractive index that falls within a range of from about 1.70 to about 2.80, or from about 1.90 to about 2.80, and the coating layer coated with the low refractive index material may have a refractive index that falls within a range from about 1.20 to about 1.50.

In a case that there is no AR layer 190 formed on the front side of the front substrate 142, some of rays, e.g., RL directed from inside of the front substrate 142 to the external air, may be Fresnel-reflected at the boundary surface between the front substrate 142 and the external air and may return to the inside of the front substrate 142, as shown in FIG. 16.

Conversely, in the case that the AR layer 190 is formed on the front side of the front substrate 142, a proportional amount of Fresnel surface reflection may be reduced, and thus a proportional amount of transmittance increases so as to improve light emission efficiency.

The AR layer 190 may be optionally included in the display panel 100, similarly as are the aforementioned smoothing layer 126, cutoff layer 170, and reflective layer 180.

An exemplary embodiment for solving a problem that the total internal reflection occurring at the boundary surface between the front substrate 142 and the external air causes degradation of image quality and efficiency has thus far been described. Another exemplary embodiment of a display panel for coping with degradation of efficiency due to light absorption of partition walls will now be described.

Figure 17:
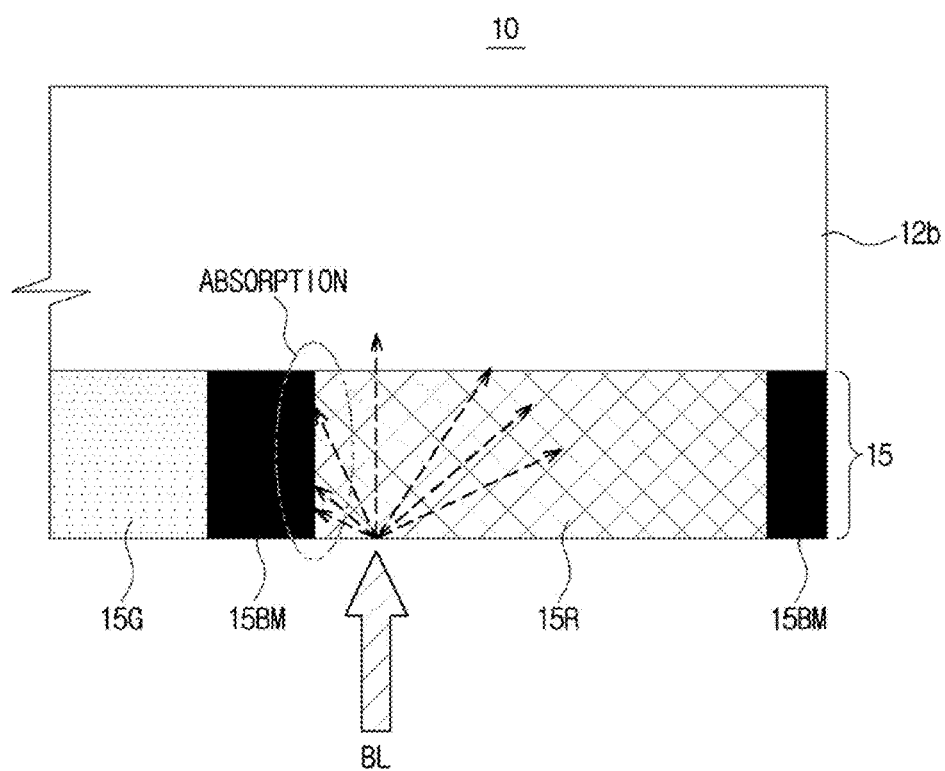
FIG. 17 shows light paths inside a display panel that includes a light conversion color filter.

FIG. 17 shows light paths inside a display panel that includes a light conversion color filter. In FIG. 17, traveling paths of light are illustrated with respect to the red light converter.

The structure of the display panel 10 shown in FIG. 17 is the same as what is shown in FIG. 1, so the description of the structure will be omitted herein.

As described above, rays which are color-converted by coming into contact with quantum dot particles are scattered. As shown in FIG. 17, blue light BL incident into the red light converter 15R may be converted to green light GL by coming into contact with red quantum dot particles, and then scattered out of the red light converter 15R.

However, some of the scattered rays are not incident into the front substrate 12b, but instead into partition walls 15BM arranged on both sides of the red light converter 15R. Each partition wall 15BM may be implemented by using a black matrix that absorbs rays of all ranges of wavelengths.

The partition wall 15BM thus absorbs the incident red light RL, and acts as a factor with respect to lowering an efficiency of the display panel 10.

Figure 18:
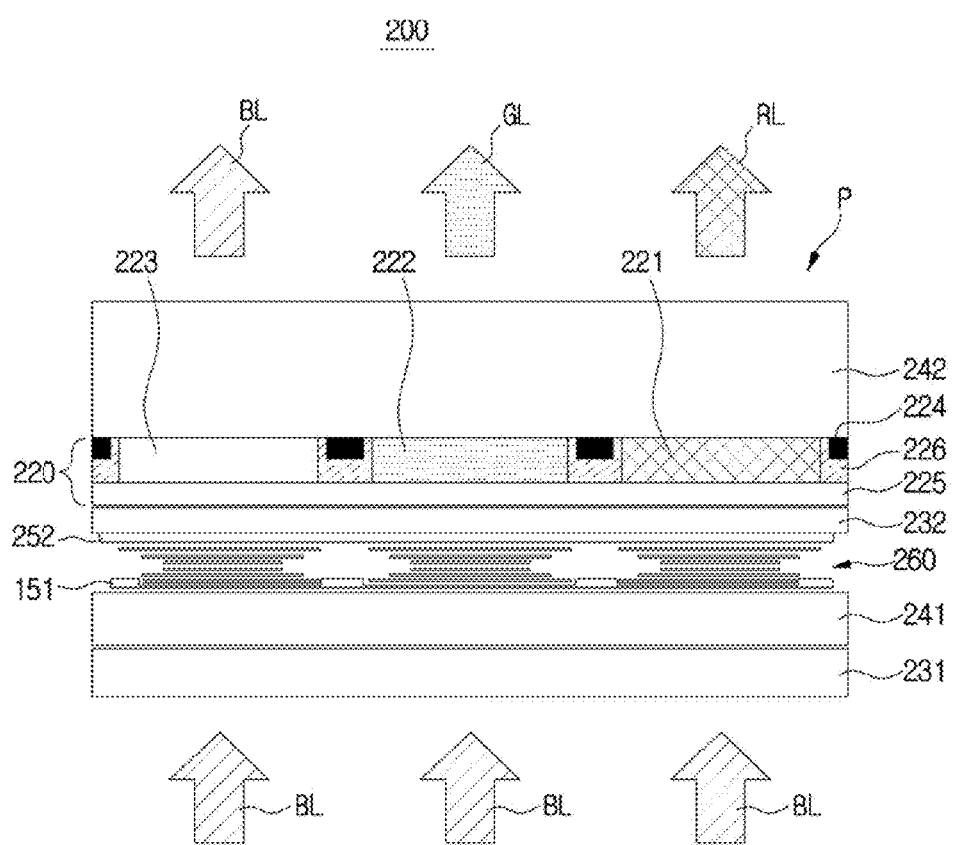
FIG. 18 is a side cross-sectional view of a display panel, according to another exemplary embodiment.
Figure 19:
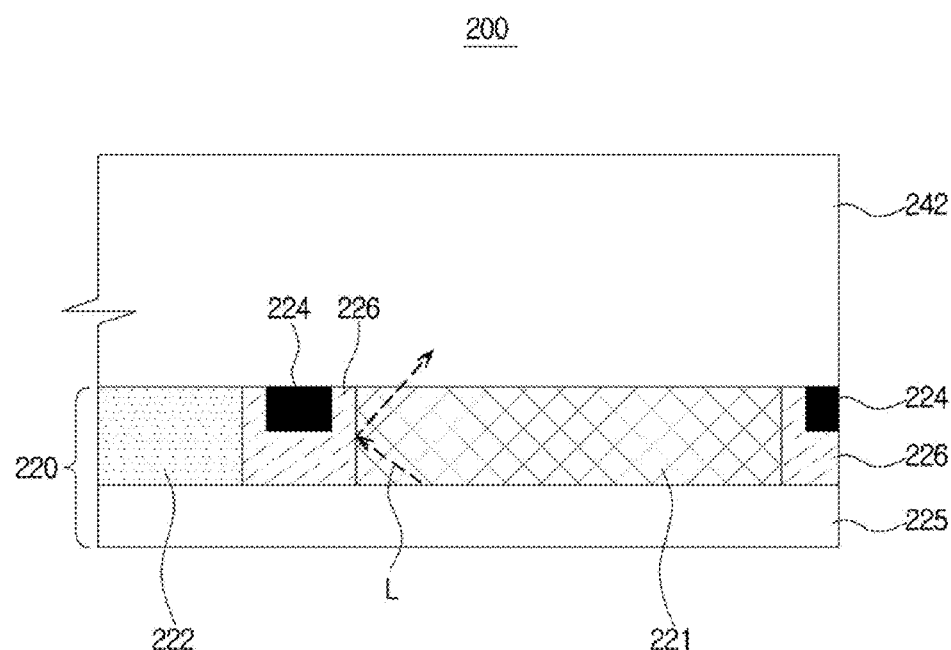
FIG. 19 shows a light path inside a display panel, according to another exemplary embodiment.

FIG. 18 is a side cross-sectional view of a display panel, according to another exemplary embodiment, and FIG. 19 shows a light path inside a display panel according to another exemplary embodiment. In the illustrative views of FIGS. 18 and 19, a direction in which light is emitted corresponds to a direction in which images are provided to a viewer who looks at the display panel 200. This is a forward direction of the display panel 200.

Referring to FIG. 18, the light, e.g., blue light BL irradiated from a back light unit, is incident to the display panel 200.

The blue light BL may be incident to a rear polarizer 231 of the display panel 200, and the rear polarizer 231 may polarize the blue light BL and only transmit rays that fluctuate in the same direction as the polarization axis to a rear substrate 241.

A rear polarizer 231 may be implemented in the form of a film, and may be implemented as a vertical polarizer that is configured to vertically polarize the incident light, or as a horizontal polarizer that is configured to horizontally polarize the incident light.

A rear substrate 241 may be located on the front face of the rear polarizer 231. The rear substrate 241 may be formed of a transparent material so as to be transparent with respect to the light which is incident from the back. For example, the rear substrate 241 may be formed of a synthetic resin, such as, for example, acryl, or glass.

A front polarizer 232 may be located ahead of the rear substrate 241, and a liquid crystal layer 260 filled with liquid crystals may be formed between the rear substrate 241 and the front polarizer 232.

The circuit formed on the front polarizer 232 ahead of the rear substrate 241 is the same as described above with respect to the aforementioned exemplary embodiment of the display panel 100, so the detailed description will be omitted herein.

When a predetermined voltage is applied to the front electrode 252 that is formed on the front polarizer 232, an electric field is produced between the front electrode 252 and the rear electrode 251 that is formed on the rear substrate 241, and the electric field regulates the array of liquid crystals of the liquid crystal layer 260. The array of liquid crystals is also the same as that described above with respect to the aforementioned exemplary embodiment, so the detailed description will be omitted herein.

A quantum dot color filter layer 220 located on the front face of the front polarizer 232 may include a red light converter 221 configured for converting an incident ray into red light, a green light converter 222 configured for converting an incident ray into green light, and a light transmitter 223 configured for facilitating a propagation of an incident ray without color conversion.

The red light converter 221 and green light converter 222 may use quantum dots to convert respective colors of light. The light transmitter 223 may have the form of a cavity for facilitating the incident light to propagate therethrough, or may be formed of a transparent resin, such as any of acryl-nitrile butadiene styrene (ABS), poly methyl methacrylate (PMMA), poly carbonate (PC), etc.

To partition the respective cells of the red light converter 221, green light converter 222, and light transmitter 223, there may be partition walls 224, which may include black matrices. The partition walls 224 may be configured to block the light from traveling into another cell, thereby improving contrast. The partition walls 224 may be formed of any of metals, synthetic resins, synthetic rubbers, etc., and may be implemented in black color so as to absorb light.

To solve the problem of efficiency degradation due to the partition walls 224 absorbing scattered light, the display panel 200 may further include reflective walls 226 which surround the partition walls 224. The reflective walls 226 may be formed of white materials so as to reflect light, such as any of titanium dioxide ($TiO_2$), zinc oxide (ZnO), iron oxide ($Fe2O_3$), chrome oxide (CrO), cobalt oxide (CoO), stannic oxide ($SnO_2$), talc and kaolin ($Al_2Si_2O_5(OH)_4$), etc., but exemplary embodiments of the display panel 200 are not limited thereto.

A front substrate 242 is located on the front face of the quantum dot color filter layer 220. Similar to the rear substrate 241, the front substrate 242 may also be formed of a synthetic resin, such as, for example, acryl, or glass.

The light irradiated from the back light unit propagates through the quantum dot color filter layer 220 and the front substrate 242 and may be viewed by the viewer as an image.

Referring to FIG. 19, even if the red light RL scattered in the red light converter 221 is directed toward the partition walls 224, the red light RL may have another chance of being emitted by being reflected on the reflective walls 226 that surround the partition walls 224 and then propagating toward and being incident back into the front substrate 242.

Furthermore, the blue light that has not been color-converted in the red light converter 221 might be directed toward the partition walls 224, in which case the reflective walls 226 that surround the partition walls 224 may reflect the incident blue light back to the red light converter 221, and thus the blue light may have another chance of being converted into red light.

In this aspect, the reflective walls 226 that surround the partition walls 224 may reflect the scattered light and the blue light moving toward the partition walls 224 and thus give them chances of being emitted or being color-converted again, thereby improving efficiency.

Although only the light paths in the red light converter 221 are described above in connection with FIG. 19 for convenience of explanation, each of green light which has been color-converted and/or blue light which has not been color-converted in the green light converter 222 may have a respective chance of being emitted or being color-converted by being reflected on the reflective walls 226.

Furthermore, the blue light may not be incident into the front substrate 242, but instead may propagate toward the partition walls 224 on either side, in which case the reflective walls 226 may also give the blue light another chance of being emitted by reflecting the blue light.

Figure 20:
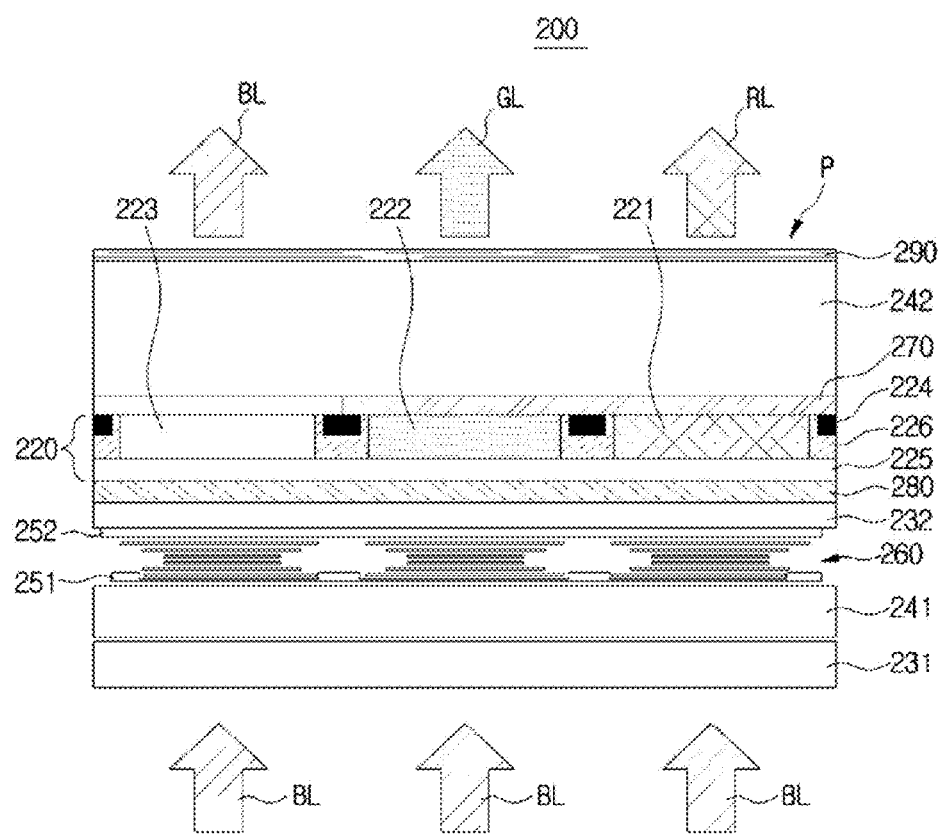
FIG. 20 is a side cross-sectional view of a display panel, according to another exemplary embodiment.

FIG. 20 is a side cross-sectional view of a display panel, according to another exemplary embodiment.

Referring to FIG. 20, the display panel 200 may further include a cutoff layer 270 configured for cutting off light that has not been color-converted. The cutoff layer 270 may be arranged between the quantum dot color filter layer 220 and the front substrate 242.

In the case that the light irradiated from the back light unit is blue light, the cutoff layer 270 may include a blue light cutoff filter. The blue light cutoff filter may be formed to be wide enough to cover the red light converter 221 and green light converter 222 of the quantum dot color filter layer 220 but not to cover the light transmitter 223 that facilitates the propagation of blue light.

Furthermore, the cutoff layer 270 may be formed for each pixel P on the quantum color filter layer 120. The cutoff layer 270 is the same as the aforementioned cutoff layer 170 of the display panel 100, so the description will be omitted herein.

The display panel 200 may further include a reflective layer 280 which is located on the rear side of the quantum dot color filter layer 220. The reflective layer 280 may be transparent with respect to wavelengths that are shorter than a particular reference wavelength, but may be configured to reflect wavelengths that are longer than the reference wavelength. For example, the reflective layer 280 may include a dichroic filter configured for transmitting rays which have a blue wavelength and for reflecting rays which have wavelengths that are shorter than the blue wavelength. The reflective layer 280 is the same as the aforementioned reflective layer 180 of the display panel 100, so the description will be omitted herein.

The display panel 200 may further include an AR layer 290 formed on the front side of the front substrate 242. In the case that the AR layer 290 is formed on the front side of the front substrate 242, a proportional amount of Fresnel surface reflection may be reduced, and thus a proportional amount of transmittance increases so as to improve light emission efficiency.

For example, the AR layer 290 may include coating layers coated with a material that has a relatively high refractive index and coating layers coated with a material that has a relatively low refractive index, which may alternate with each other in multiple layers. The AR layer 290 is the same as in the aforementioned display panel 100, so the detailed description will be omitted herein.

The smoothing layer 225, cutoff layer 270, reflective layer 280, and AR layer 290 may be optionally included in the display panel 200. The display panel 200 may include all of these elements, or may include only some of these elements, or may not include any of these elements.

Figure 21:
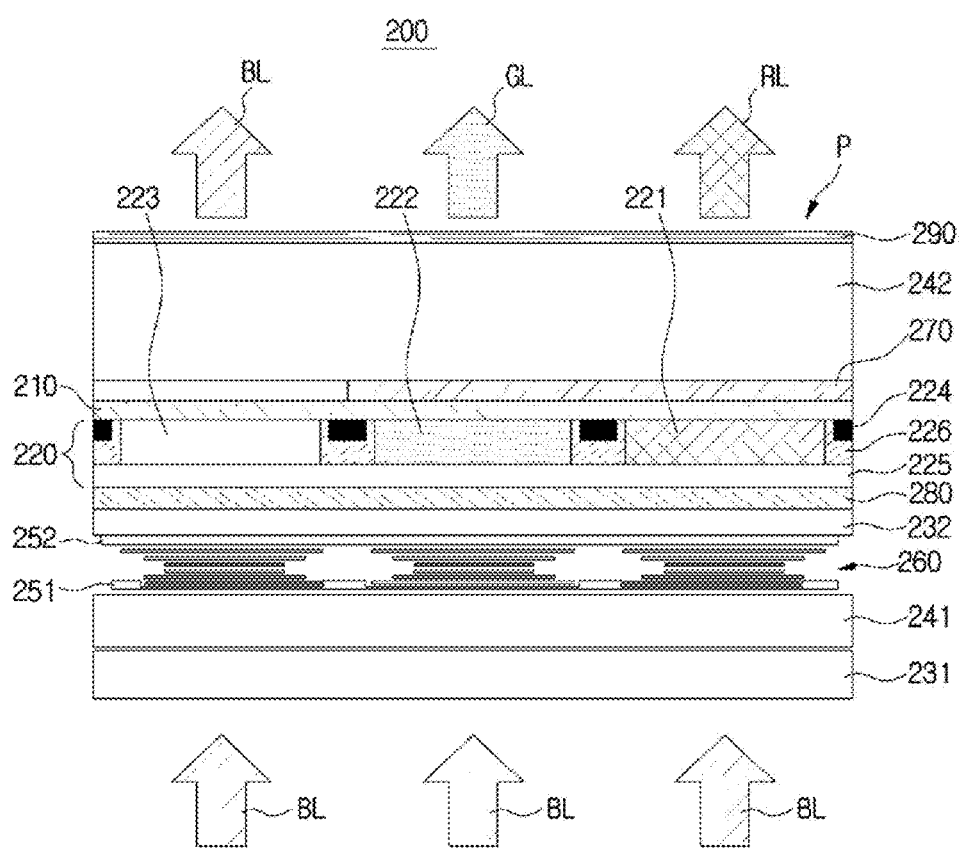
FIG. 21 is a side cross-sectional view of a display panel, according to another exemplary embodiment.
Figure 22:
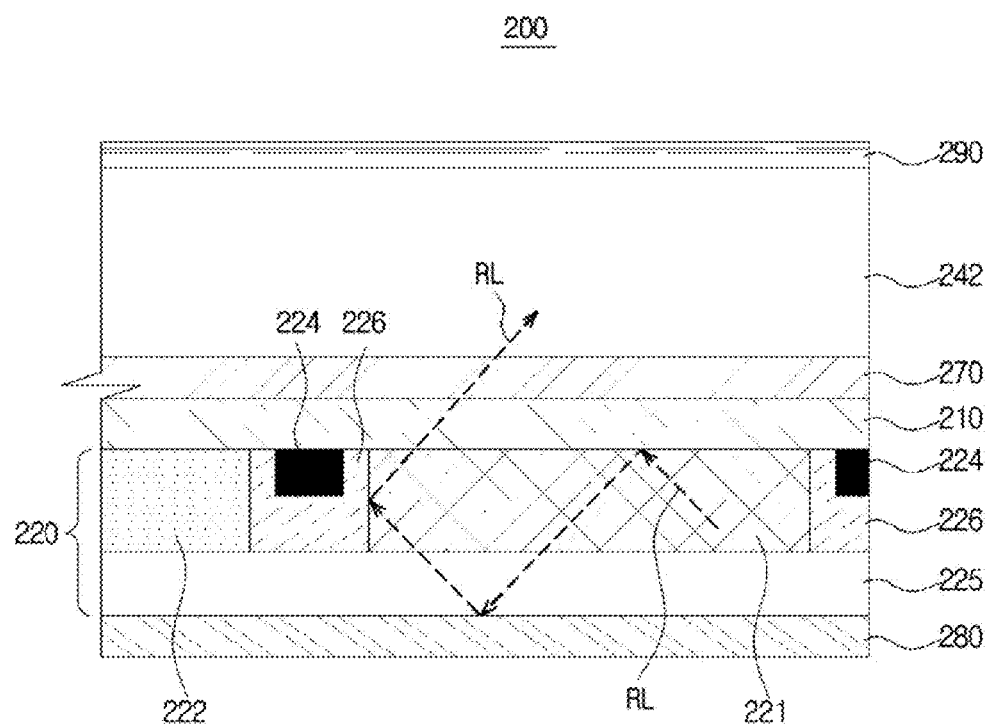
FIG. 22 shows a light path inside the display panel of FIG. 21.

FIG. 21 is a side cross-sectional view of a display panel, according to another exemplary embodiment of the present disclosure, and FIG. 22 shows a light path inside the display panel of FIG. 21.

Referring to FIG. 21, the display panel 200 may further include a low refractive layer 210 which is formed of a medium which has a relatively low refractive index. The low refractive layer 210 may be arranged between the quantum dot color filter layer 220 and the front substrate 242, but if the display panel 200 includes the cutoff layer 270 as shown in FIG. 21, the low refractive layer 210 may be arranged between the cutoff layer 270 and the quantum dot color filter layer 220.

The low refractive layer 210 may have a lower refractive index than the quantum dot color filter layer 220. Furthermore, the low refractive layer 210 may have a lower refractive index than the front substrate 242, which is located ahead of the low refractive layer 110. For example, the low refractive layer 210 may have a refractive index that falls within a range of from about 1.0 to about 1.4.

The low refractive layer 210 may be formed of a resin within which nano-particles, such as zinc oxide (Zn), titanium dioxide ($TiO_2$), etc., are distributed in the resin, but the materials are only by way of example, and exemplary embodiments of the display panel 200 are not limited thereto.

The low refractive layer 210 may reduce a proportional amount of total internal reflection at the boundary surface between the front substrate 242 and the external air by reducing an incidence angle at which the light is incident from the front substrate 242 into the external air, or by totally reflecting rays having large incidence angles. The low refractive layer 210 is the same as that described above with respect to the aforementioned display panel 100, so the detailed description will be omitted herein.

With respect to a light path as illustrated in FIG. 22, some of red rays RL that are incident from the red light converter 221 of the quantum dot color filter layer 220 into the low refractive layer 210 at angles greater than the total reflection threshold angle are totally internally reflected and returned at the boundary surface between the red light converter 221 and the low refractive layer 210. In this case, some of the totally reflected red rays RL may propagate toward either side, and may be reflected by the reflective walls 226 surrounding the partition walls 224 formed on both sides of the red light converter 221 into the front substrate 242 without being absorbed by the partition walls 224, as shown in FIG. 22, and thus be likely to be emitted out of the front substrate 242. Accordingly, a light output efficiency of the display panel 200 may further be improved.

A display device 300 that includes the display panel 100 or 200 in accordance with one or more exemplary embodiments will now be described.

Figure 23:
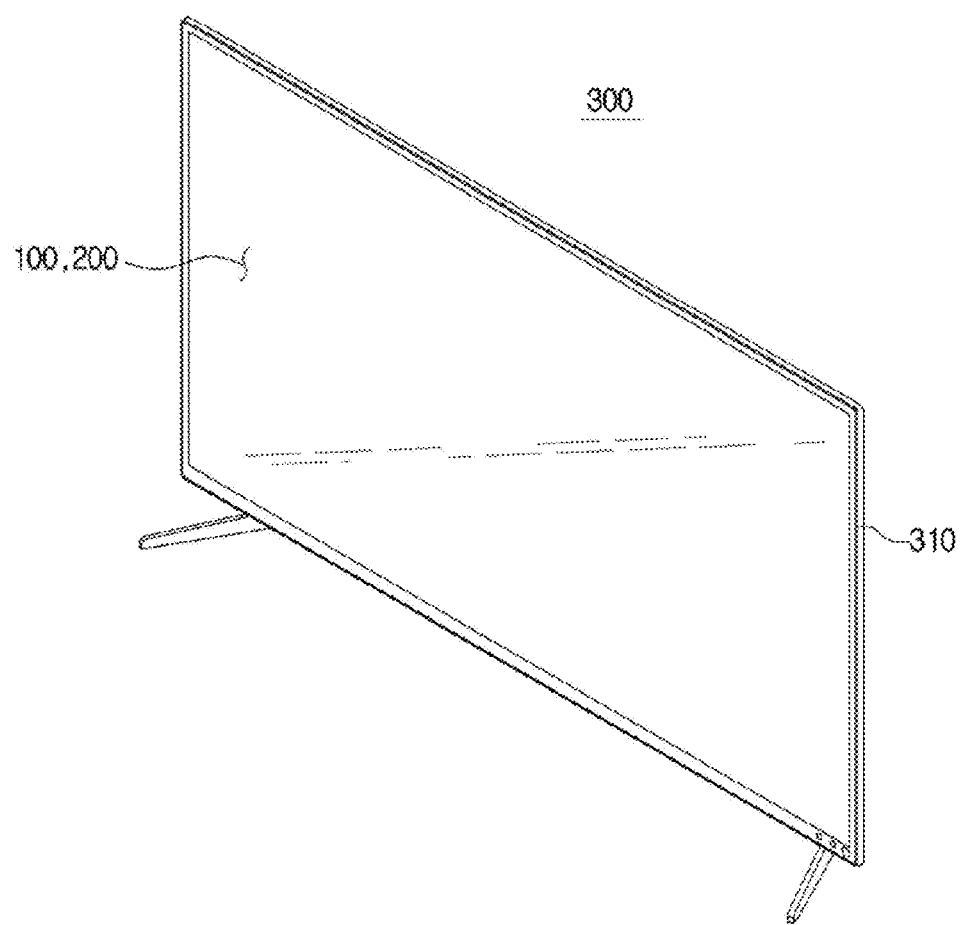
FIG. 23 is an exterior view of a display device, according to an exemplary embodiment.
Figure 24:
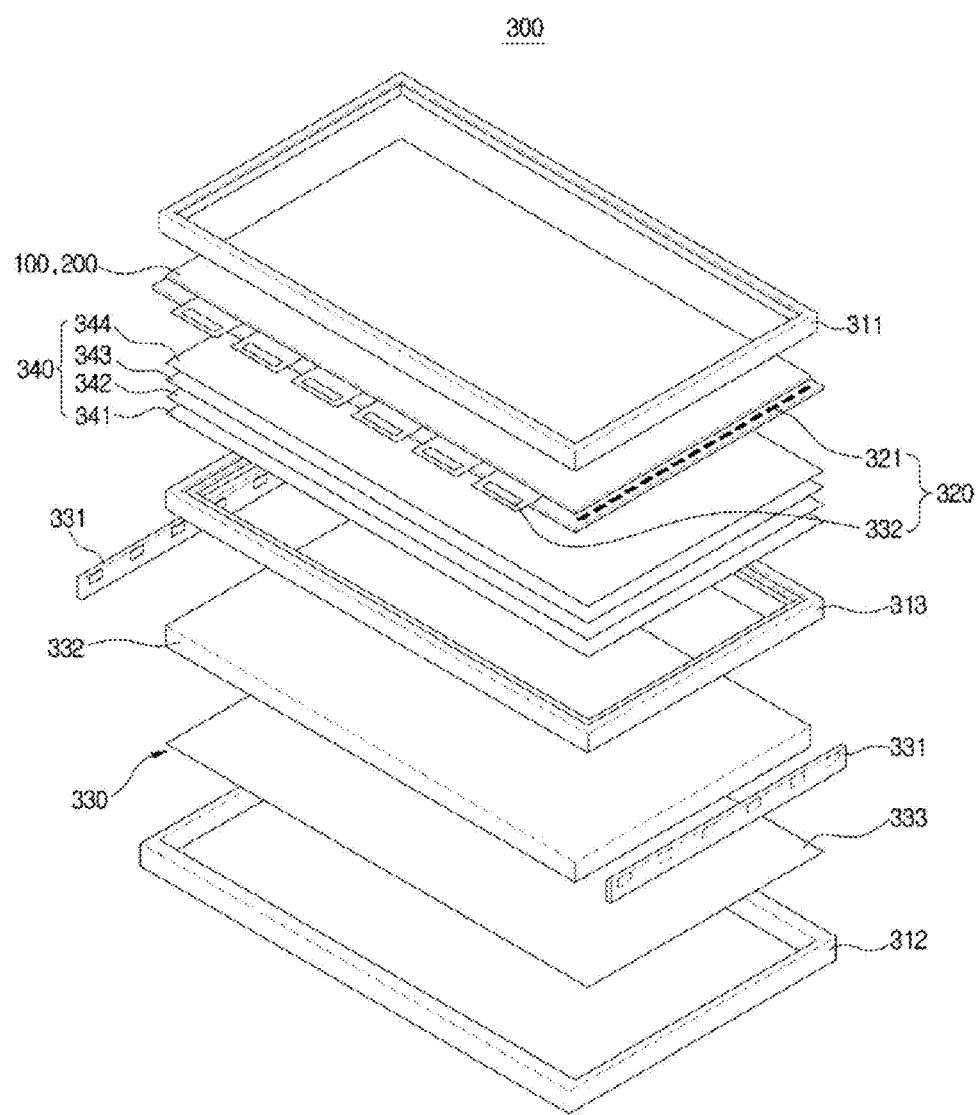
FIG. 24 is an exploded view of a display device, according to an exemplary embodiment.

FIG. 23 is an exterior view of a display device according to an exemplary embodiment, and FIG. 24 is an exploded view of a display device, according to an exemplary embodiment.

The display device 300 is a device which is configured for processing image signals received from the outside and for visually presenting the processed image. In the following description, it is assumed that the display device 300 is a television (TV), but exemplary embodiments are not limited thereto. For example, the display device 300 may be implemented in various forms, such as any of a monitor, a portable multimedia device, a portable communication device, and any device that may visually present images.

Referring to FIGS. 23 and 24, the display device 300 includes a main exterior frame 310 that houses various parts, and a display panel 100 or 200 which is configured for displaying images. In particular, the display device 300 may include one of the display panel 100 and the display panel 200 as described above with respect to different exemplary embodiments.

Inside the main frame 310, there are a driving circuit 320, a back light unit (BLU) 330, and an optical member 340.

The main frame 310 may include a front chassis 311 located on the front of the display device 300, a rear chassis 312 located on the rear side of the display device 300, and a mold frame 313 located inside the display device 300.

The front chassis 311 may be coplanar with the display panel 100 or 200 for displaying images such that edges of the display panel 300 are not exposed.

The rear chassis 312 may be arranged on the opposite side of the display panel 100 or 200, so as not to expose various parts included in the display device 300, and so as to protect the various parts of the display device 300 against external shocks.

The mold frame 313 restricts movement of the display panel 100 or 200, optical member 340, and BLU 330, and fastens these elements to the front chassis 311 and rear chassis 312.

The driving circuit 320 is configured to provide driving signals in order to drive the display panel 100 or 200. The driving circuit 320 may include a gate driving circuit 321 and a data driving circuit 322.

The gate driving circuit 321 may be connected to gate lines (not shown) of the display panel 100, 200 and configured for sending gate signals to the gate lines. The data driving circuit 322 may be connected to data lines (not shown) of the display panel 100, 200 and configured for sending data signals to the data lines.

The BLU 330 is installed behind the display panel 100 or 200 and configured for illuminating the display panel 100 or 200 so as to create an image. The BLU 330 may be classified into an edge-type BLU within which respective light sources are located on corresponding sides of the display panel 100 or 200, and a direct-type BLU within which a light source is located behind the display panel 100 or 200.

In the following description, it is assumed that the BLU 330 corresponds to the edge-type BLU.

The BLU 330 includes a light source 331 configured for generating light, a light guide plate (LGP) 332 configured for converting the light generated by the light source 331 to sheet light, and a reflector sheet 333 formed on the rear face of the LGP 332 and configured for reflecting light which is output from the LGP 332.

Each of the light sources 331 is arranged on a respective side of the LGP 332 and configured for irradiating rays toward the LGP 332.

For example, the light source 331 may be configured to produce blue light.

The light source 331 may employ, for example, low calorific LEDs and/or a Cold Cathode Fluorescent Lamp (CCFL).

The LGP 332 is configured to output light in the forward direction by changing a direction in which the incident light is propagating. To change the light propagation direction, a plurality of swollen stripes may be formed on the front face of the LGP 332, and a plurality of dots may be formed on the rear face of the LGP 332. The respective sizes and intervals of the swollen stripes and dots may be adjusted in order to produce uniform light in the forward direction of the LGP 332.

Furthermore, the swollen stripes on the front face of the LGP 332 may be embossed via execution of a printing method, and the dots on the rear face of the LGP 332 may be formed in intaglio with laser beams.

Some of the rays incident into the LGP 332 are scattered by the dots formed on the rear face of the LGP 332 and emitted in the forward direction of the LGP 332, and some other rays are reflected by the reflector sheet 333 formed on the rear face of the LGP 332 toward the inside of the LGP 332. Moreover, some of the reflected rays may propagate toward the center of the LGP 332, and be emitted in the forward direction of the LGP 332 as a result of being scattered at the center of the LGP 332.

In this manner, the LGP 332 may facilitate a relatively uniform emission of rays in the forward direction via refraction, reflection, and scattering of the rays produced from inside the LGP 332.

Such an LGP 332 may employ a transparent and robust PMMA or PC material.

The reflective sheet 333 is formed on the rear side of the LGP 332 as described above, and is configured to cause some of the rays directed toward the rear face of the LGP 332 from inside of the LGP 332 to be reflected toward the inside of the LGP 332.

The reflective sheet 333 is manufactured by coating a base material with a material that has a relatively high reflective index. For example, the reflective sheet 333 may be manufactured by coating polyethylene terephthalate (PET) with a highly reflective polymer.

As described above, the BLU 330 may include the light source 331, the LGP 332, and the reflective sheet 333, and may be configured to uniformly emit sheet light.

The optical member 340 is configured to bend or scatter light in order to widen the viewing angle of the display device 300 and increase a brightness of the display device 300.

The optical member 340 may include various sheets. For example, the optical member 340 may include any of a diffuser sheet 341, a prism sheet 342, a protective sheet 343, and a brightness enhancement film 344.

The diffuser sheet 341 is configured to diffuse rays which are output from the BLU 330 along a plane, thereby enabling overall colors and brightness of the screen of the display device 300 to be uniformly viewed. Since the rays output from the LGP 332 are output in accordance with patterns formed on the front face of the LGP 332, the patterns may be viewed from the rays output from the LGP 332.

In order to prevent the patterns formed on the front face of the LGP 332 from being viewed, the diffuser sheet 341 is further configured to diffuse the light output from the LGP 332 in a direction that is perpendicular to the direction in which the light is output.

In this aspect, the diffuser sheet 341 diffuses the light output from the BLU 330 so as to maintain a relatively uniform brightness of the entire plane.

Light is diffused in the direction that is perpendicular to the plane of the diffuser sheet 341 while propagating through the diffuser sheet 341, thereby drastically lowering the brightness. The prism sheet 342 refracts or focuses the light diffused by the diffuser sheet 341, thereby increasing the brightness.

Moreover, the prism sheet 342 includes prism patterns of a triangular prism form, and the prism patterns are arranged adjacent to one another to form a plurality of strips. In particular, the prism patterns are formed so as to protrude toward the display panel 100 or 200 in a pattern of alternating ridges and valleys.

The protective sheet 343 protects many different parts included in the BLU 330 against external shocks or inflow of foreign materials. The protective sheet 343 may also protect the prism sheet 342, which is susceptible to scratches.

The brightness enhancement film 344 is a type of polarizer film, and may also be referred to as a reflective polarizer film. The brightness enhancement film 344 is transparent to some of rays which are output from the BLU 330, which are polarized in parallel with the polarization direction of the brightness enhancement film 344, and is configured to reflect some other rays which are polarized in different directions than the polarization direction of the brightness enhancement film 344.

The rays are known as transverse waves that fluctuate in a direction which is perpendicular to the light propagation direction. The polarizer film is transparent to some fluctuating rays, which fluctuate in a particular direction, and is configured to absorb other rays that fluctuate in directions other than the particular direction.

On the contrary, the brightness enhancement film 344 is configured to reflect rays that are polarized in other directions than the polarization direction of the brightness enhancement film 344. The reflected rays are recycled inside the BLU 330, and the light recycling contributes to an improvement of the brightness of the display device 300.

According to exemplary embodiments of the display panel and display device having the same, a total-reflective layer formed of a low refractive material may be arranged between a quantum dot filter layer and a glass substrate, so as to reduce a proportional amount of light that has propagated through the quantum dot filter layer and that is totally reflected at the glass substrate.

Furthermore, the quantum dot filter layer may coat partition walls so as to separate respective color regions with a high reflective material, in order to recycle the light incident to the partition walls and thus improve efficiency.

Several exemplary embodiments have been described above, but a person of ordinary skill in the art will understand and appreciate that various modifications can be made without departing from the scope of the present disclosure. Thus, it will be apparent to those of ordinary skill in the art that the present disclosure is not limited to the exemplary embodiments described above, which have been provided only for illustrative purposes.

Exemplary embodiments and features as described and illustrated in the present disclosure are only preferred examples, and various modifications thereof may also fall within the scope of the present disclosure.

The terminology used herein is for the purpose of describing particular exemplary embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including any modifiers like "rear" and "front" may be used to explain various components, but the components are not limited by the terms. The terms are only for the purpose of distinguishing a component from another. For example, a rear element, component, region, layer or section could be termed a front element, component, region, layer or section without departing from the teachings of the present disclosure.

Furthermore, the terms as used throughout the specification, such as "~part", "~block", "~member", "~module", etc., may refer to a unit that is configured for performing at least one function or operation.

What is claimed is:

1. A display panel comprising:
    a quantum dot color filter layer configured to convert a color of light emitted from a back light unit, the quantum dot color filter layer having a first refractive index;
    a transparent front substrate provided at a first side of the quantum dot color filter layer, the transparent front substrate having a second refractive index;
    a low refractive layer provided between the quantum dot color filter layer and the transparent front substrate, the low refractive layer having a third refractive index that is lower than the first refractive index of the quantum dot color filter layer; and
    a cutoff layer disposed between the transparent front substrate and the low refractive layer to cut off the light not converted by the quantum dot color filter layer,
    wherein the third refractive index of the low refractive layer is lower than the second refractive index of the transparent front substrate, and
    wherein the second refractive index of the transparent front substrate is higher than the first refractive index of the quantum dot color filter layer.

2. The display panel of claim 1, wherein the third refractive index of the low refractive layer falls within a range of between 1.0 and 1.4.

3. The display panel of claim 1, wherein the low refractive layer comprises a resin within which nano-particles are distributed, and
    wherein the nano-particles include at least one from among titanium dioxide ($TiO_2$) and zinc oxide (ZnO).

4. The display panel of claim 1, wherein the light comprises blue light, and
    wherein the display panel further comprises a reflective layer provided at a second side of the quantum dot color filter layer that is opposite to the first side of the quantum dot filter color layer, the reflective layer being configured to transmit the blue light therethrough and reflect light that has a wavelength longer than a wavelength of the blue light.

5. The display panel of claim 1, further comprising an anti-reflective (AR) layer coated on a surface of the transparent front substrate and configured to prevent Fresnel reflection.

6. A display panel comprising:
    a quantum dot color filter layer comprising a plurality of converters and partition walls provided between the plurality of converters, each of the plurality of converters comprising quantum dot particles configured to convert a color of light, and each of the partition walls being configured to absorb light;
    a front substrate provided at a first side of the quantum dot color filter layer;
    a low refractive layer provided between the quantum dot color filter layer and the front substrate and having a refractive index that is lower than a refractive index of the quantum dot color filter layer;

a cutoff layer disposed between the front substrate and the low refractive layer to cut off the light not converted by the quantum dot color filter layer; and reflective walls which surround the partition walls and are configured to reflect light which propagates toward the partition walls, wherein the refractive index of the low refractive layer is lower than the refractive index of the front substrate, and wherein the refractive index of the front substrate is higher than the refractive index of the quantum dot color filter layer.

7. The display panel of claim 6, wherein each of the reflective walls includes at least one reflective material from among titanium dioxide ($TiO_2$), zinc oxide (ZnO), iron oxide ($Fe_2O_3$), chrome oxide (CrO), cobalt oxide (CoO), stannic oxide (SnO2), talc, and kaolin ($Al_2Si_2O_5(OH)_4$).

8. The display panel of claim 6, wherein the refractive index of the low refractive layer falls within a range of between 1.0 and 1.4.

9. The display panel of claim 8, wherein the low refractive layer comprises a resin within which nano-particles are distributed, and wherein the nano-particles include at least one from among titanium dioxide ($TiO_2$) and zinc oxide (ZnO).

10. The display panel of claim 8, wherein the refractive index of the low refractive layer is lower than a refractive index of the front substrate.

11. The display panel of claim 8, further comprising an anti-reflective (AR) layer coated on a surface of the front substrate and configured to prevent Fresnel reflection.

12. A display device comprising:
a back light unit which includes a light source configured to emit light;
a quantum dot color filter layer configured to convert a color of light emitted from the light source, the quantum dot color filter layer having a first refractive index;
a front substrate provided at a first side of the quantum dot color filter layer that is opposite to a second side of the quantum dot color filter layer at which the back light unit is provided, the front substrate having a second refractive index;
a low refractive layer provided between the quantum dot color filter layer and the front substrate, the low refractive layer having a third refractive index that is lower than the first refractive index of the quantum dot color filter layer; and
a cutoff layer disposed between the front substrate and the low refractive layer to cut off the light not converted by the quantum dot color filter layer,
wherein the third refractive index of the low refractive layer is lower than the second refractive index of the front substrate, and
wherein the second refractive index of the front substrate is higher than the first refractive index of the quantum dot color filter layer.

13. The display device of claim 12, wherein the third refractive index of the low refractive layer falls within a range of between 1.0 and 1.4.

14. The display device of claim 12, wherein the low refractive layer comprises a resin within which nano-particles are distributed, and wherein the nano-particles include at least one from among titanium dioxide ($TiO_2$) and zinc oxide (ZnO).

15. The display device of claim 12, wherein the light emitted from the light source comprises blue light, and
wherein the display device further comprises a reflective layer provided between the quantum dot color filter layer and the back light unit, the reflective layer being configured for transmit the blue light therethrough and reflect light that has a wavelength longer than a wavelength of the blue light.

16. The display device of claim 12, further comprising an anti-reflective (AR) layer coated on a surface of the front substrate and configured to prevent Fresnel reflection.

* * * * *